(12) United States Patent
Yu et al.

(10) Patent No.: US 12,041,313 B2
(45) Date of Patent: Jul. 16, 2024

(54) DATA PROCESSING METHOD AND APPARATUS, DEVICE, AND MEDIUM

(71) Applicant: Tencent Technology (Shenzhen) Company Limited, Shenzhen (CN)

(72) Inventors: Guangwen Yu, Shenzhen (CN); Huafeng Fan, Shenzhen (CN); Tao Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 57 days.

(21) Appl. No.: 17/989,620

(22) Filed: Nov. 17, 2022

(65) Prior Publication Data

US 2023/0109852 A1 Apr. 13, 2023

Related U.S. Application Data

(63) Continuation of application No. PCT/CN2022/074513, filed on Jan. 28, 2022.

(30) Foreign Application Priority Data

Feb. 8, 2021 (CN) .......................... 202110179007.4

(51) Int. Cl.
  *H04N 21/488* (2011.01)
  *G10L 15/26* (2006.01)
  *H04N 21/854* (2011.01)
(52) U.S. Cl.
  CPC ......... *H04N 21/4888* (2013.01); *G10L 15/26* (2013.01); *H04N 21/854* (2013.01)
(58) Field of Classification Search
  CPC ............. H04N 21/4888; H04N 21/854; H04N 21/41407; H04N 21/42203; H04N 21/4334; H04N 5/2222; H04N 5/77; H04N 5/915; H04N 21/8173; H04N 23/06; G10L 15/26; G10L 17/00; G10L 25/78; G10L 15/22; G10L 15/02; G06F 3/16; G06F 3/167

See application file for complete search history.

(56) References Cited

U.S. PATENT DOCUMENTS

2018/0061256 A1  3/2018  Elchik et al.

FOREIGN PATENT DOCUMENTS

| CN | 111372119 A | 7/2020 |
| CN | 112738618 A | 4/2021 |
| CN | 113301362 A | 8/2021 |

OTHER PUBLICATIONS

Tencent Technology, ISR, PCT/CN2022/074513, Apr. 8, 2022, 2 pgs.

(Continued)

*Primary Examiner* — Anthony Bantamoi
(74) *Attorney, Agent, or Firm* — Morgan, Lewis & Bockius LLP

(57) ABSTRACT

A data processing method includes: in response to a service enabling operation in a video application, enabling a video recording service in the video application; collecting, using the video recording service, user voice data; determining and identifying a target text that matches prompting text data associated with the video recording service; and acquiring target video data corresponding to the video recording service until a text position of the target text in the prompting text data is at an end of the prompting text data. Embodiments of this application improve the effectiveness of teleprompting functions during a video recording, and the quality of a recorded video may further be improved.

20 Claims, 13 Drawing Sheets

(56) References Cited

OTHER PUBLICATIONS

Tencent Technology, WO, PCT/CN2022/074513, Apr. 8, 2022, 6 pgs.
Tencent Technology, IPRP, PCT/CN2022/074513, Aug. 3, 2023, 7 pgs.

DATA PROCESSING METHOD AND APPARATUS, DEVICE, AND MEDIUM

CROSS-REFERENCE TO RELATED APPLICATIONS

This application is a continuation application of PCT Patent Application No. PCT/CN2022/074513, entitled "DATA PROCESSING METHOD AND APPARATUS, DEVICE, AND MEDIUM" filed on Jan. 28, 2022, which claims priority to Chinese Patent Application No. 202110179007.4, filed with the Chinese Patent Office on Feb. 8, 2021 and entitled "DATA PROCESSING METHOD AND APPARATUS, DEVICE, AND MEDIUM", which is incorporated herein by reference in its entirety.

FIELD OF THE TECHNOLOGY

This application relates to the field of Internet technology, and particularly to a data processing technology.

BACKGROUND OF THE DISCLOSURE

With the development of short videos, more and more users (including people without any experience in filming and editing) have joined the rank of multimedia creators to begin show their performance in front of cameras. For an inexperienced multimedia creator, forgetting words and other conditions often occur in the face of a camera, and even if a content script is memorized, there are problems such as stammering or unnatural expression.

Therefore, when shooting a short video, a user may print out a script content and put it next to a camera for prompting.

However, when a script includes many contents, the user may not be able to quickly position the content to be delivered, or there is a positioning error, and the effect of printing the script content to prompt words is not obvious. In addition, when the user glances at the script content beside the camera, the camera may get the action of the user in, further affecting the quality of a final video.

SUMMARY

Embodiments of this application provide a data processing method and apparatus, a device, and medium, which may improve the effectiveness of a teleprompter function in a video recording service to further improve the quality of a recorded video.

An aspect of the embodiments of this application provides a data processing method, performed by a computer device and including:

in response to a service enabling operation in a video application, enabling a video recording service in the video application;

collecting, using the video recording service, user voice data;

determining and identifying in the user voice data, a target text that matches the user voice data prompting text data associated with the video recording service; and acquiring target video data corresponding to the video recording service until a text position of the target text in the prompting text data is at an end of the prompting text data.

An aspect of the embodiments of this application provides a data processing method, performed by a computer device and including:

uploading prompting text data to a teleprompter application;

collecting user voice data corresponding to a target user, and performing text conversion on the user voice to generate a user voice text corresponding to the user voice data; and determining a text that matches the user voice text in the prompting text data as a target text, and identifying the target text in the teleprompter application.

An aspect of the embodiments of this application provides a data processing apparatus, deployed on a computer device and including:

an enabling module, configured to enable a video recording service in a video application in response to a service enabling operation in the video application;

a display module, configured to collect user voice data using the video recording service, determine a target text that matches the user voice data in prompting text data associated with the video recording service, and identify the target text; and an acquisition module, configured to acquire target video data corresponding to the video recording service until a text position of the target text in the prompting text data is at an end of the prompting text data.

An aspect of the embodiments of this application provides a data processing apparatus, deployed on a computer device and including:

a prompting text uploading module, configured to upload prompting text data to a teleprompter application;

a user voice collection module, configured to collect user voice data corresponding to a target user, and perform text conversion on the user voice data to generate a user voice text corresponding to the user voice; and a user voice text display module, configured to determine a text that matches the user voice text in the prompting text data as a target text, and identify the target text in the teleprompter application.

An aspect of the embodiments of this application provides a computer device, including: a memory and a processor, the memory being connected to the processor, the memory being configured to store a computer program, and the processor being configured to invoke the computer program, to cause the computer device to perform the method according to any one of the foregoing aspects in the embodiments of this application.

An aspect of the embodiments of this application provides a computer-readable storage medium, storing a computer program, the computer program being loaded and executed by a processor, to cause a computer device having the processor to perform the method according to any one of the foregoing aspects in the embodiments of this application.

An aspect of the embodiments of this application provides a computer program product or a computer program, the computer program product or the computer program including computer instructions, the computer instructions being stored in a computer-readable storage medium. A processor of a computer device reads the computer instructions from the computer-readable storage medium, and executes the computer instructions, so that the computer device performs the method according to any one of the foregoing aspects.

According to the embodiments of this application, a video recording service in a video application is enabled in response to a service enabling operation in the video application, user voice data in the video recording service is collected, a target text associated with the user voice data in prompting text data associated with the video recording service is determined, and the target text is identified. In this manner, a user who is speaking can quickly and accurately locate within the prompting text data, a position corresponding to the target text, so that the effectiveness of a text prompting function in the video recording service is improved. Target video data corresponding to the video recording service is acquired until a text position of the target text in the prompting text data is at an end of the prompting text data. It can be seen that, after the video recording service is enabled in the video application, the target text matching the user voice data in the prompting text data may be positioned and identified, namely the target text displayed in the video application is matched with what the user is saying. Therefore, the effectiveness of the text prompting function in the video recording service is improved, the risk of recording failure caused by the user forgetting the words is reduced, and the quality of the recorded video may further be improved.

DESCRIPTION OF EMBODIMENTS

The following clearly and completely describes technical solutions in the embodiments of this application with reference to the accompanying drawings in the embodiments of this application.

Figure 1:
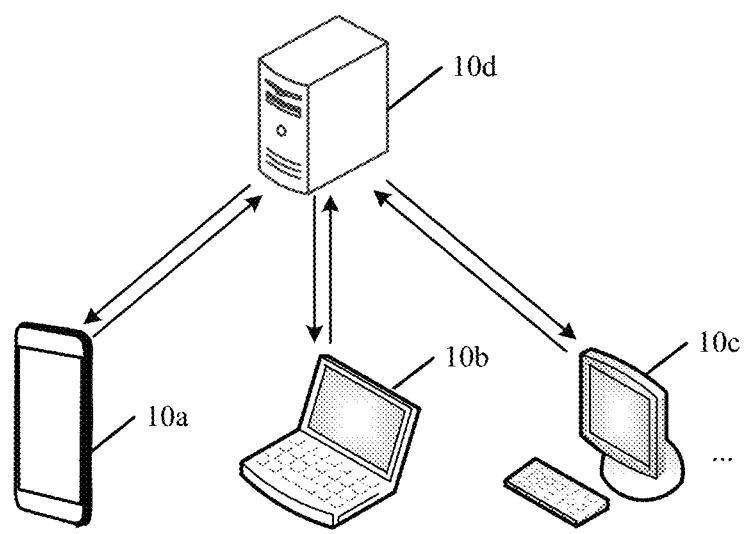
FIG. 1 is a schematic structural diagram of a network architecture according to an embodiment of this application.

Referring to FIG. 1, FIG. 1 is a schematic structural diagram of a network architecture according to an embodiment of this application. As shown in FIG. 1, the network architecture may include a server 10d and a user terminal cluster. The user terminal cluster may include one or more user terminals. The number of the user terminals is not limited herein. As shown in FIG. 1, the user terminal cluster may specifically include a user terminal 10a, a user terminal 10b, a user terminal 10c, etc. The server 10d may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data an artificial intelligence platform. The user terminal 10a, the user terminal 10b, the user terminal 10c, etc. are may all include: an intelligent terminal having a video/image playback function such as a smart phone, a tablet computer, a notebook computer, a palmtop computer, a mobile Internet device (MID), a wearable device (such as a smartwatch, a smart band and the like), and a smart television. As shown in FIG. 1, each of the user terminal 10a, the user terminal 10b, the user terminal 10c, etc., may establish a network connection with the server 10d so as to perform data interaction with the server 10d through the network connection.

Taking the user terminal 10a shown in FIG. 1 as an example, a video application with a video recording function may be installed in the user terminal 10a. The video application may be a video editing application, a short video application, etc. A user can open the video application installed in the user terminal 10a. The video application may provide the video recording function for the user. The video recording function may include a conventional shooting mode and a teleprompter shooting mode. In the conventional shooting mode, script contents may not be prompted to the user when the user is shot by a camera of the user terminal 10a (or an external photographic device in communication connection with the user terminal 10a), and the user needs to sort out in advance the script contents to be delivered (for example, recording the script contents) in a video recording process. In the teleprompter shooting mode, the script contents may be displayed to the user on a terminal screen of the user terminal 10a when the user is shot by the camera of the user terminal 10a or the external photographic device, and the script contents may be switched for displaying (for example, scrolling for displaying) according to a progress of user voice data. The script content may also be referred to as prompting text data in a video recording service. After the user executes a triggering operation on an entry (i.e., teleprompter shooting entry) corresponding to the teleprompter shooting mode in the video application, the user terminal 10a may display a recording page in the video application in response to the triggering operation for the teleprompter shooting entry. Before recording, the user may input the prompting text data to the recording page, or upload the existing prompting text data to the recording page.

When the user enables video recording, the user terminal 10a may enable the video recording function in the video application in response to a video recording enabling operation of the user, and display the prompting text data on the terminal screen of the user terminal 10a according to the progress of the user voice in the video recording process. In other words, the prompting text data may be displayed in the video recording process according to the progress of the user voice. When a user speech rate increases, a switching displaying speed (which may be a scrolling speed) of the prompting text data in the video application increases. When the user speech rate decreases, the switching displaying speed of the prompting text data in the video application decreases. That is, the text of the prompting text data displayed in the video application is matched with the user voice. Therefore, the effectiveness of a text prompting function in the video recording process is ensured to help the user smoothly complete video recording, and the quality of the recorded video may further be improved.

Figure 2:
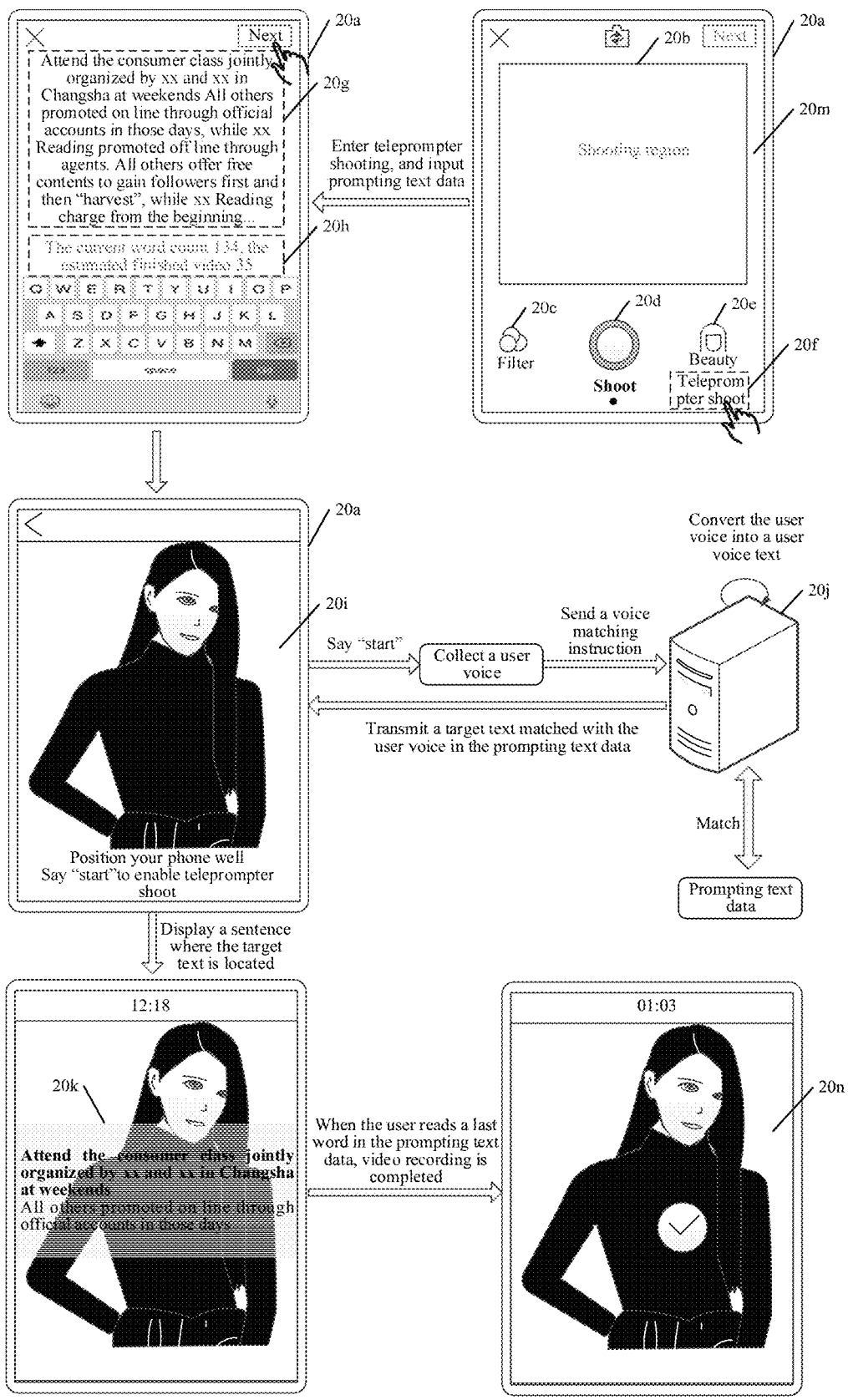
FIG. 2 is a schematic diagram of a data processing scenario according to an embodiment of this application.

Referring to FIG. 2 together, FIG. 2 is a schematic diagram of a data processing scenario according to an embodiment of this application. An implementation process of a data processing method provided in the embodiments of this application is described taking a video recording scenario as an example. A user terminal 20a shown in FIG. 2 may be any user terminal in the user terminal cluster shown in FIG. 1. A video application is installed in the user terminal 20a, which has a video recording function. User A (user A may be a user of the user terminal 20a) may open the video application in the user terminal 20a to enter a home page of the video application. The user may execute a triggering operation on a shooting entry in the video application. The user terminal 20a displays a shooting page 20m in the video application in response to the triggering operation for the shooting entry. The shooting page 20m may include a shooting region 20b, a filter control 20c, a shooting control 20d, a beauty control 20e, etc. The shooting region 20b is used for displaying a video image collected by the user terminal 20a. The video image may be a video image for user A that may be collected by a camera of the user terminal 20a or a photographic device in communication connection with the user terminal 20a. The shooting control 20d may be used for controlling enabling and disabling of video recording. A triggering operation is executed on the shooting control 20d after the shooting page 20m is entered to start shooting, and a shot video image may be displayed in the shooting region 20b. A triggering operation is executed again on the shooting control 20d during shooting to stop shooting, and the video image displayed in the shooting region 20b may be frozen to be an image obtained when shooting is stopped. The filter control 20c may be used for processing the video image collected by the user terminal 20a so as to achieve a certain special effect. For example, a smoothing filter may perform skin retouching, touching up, smoothing, etc., on a portrait in the collected video image. The beauty control 20e may be used for performing a retouching process on the portrait in the video image collected by the user terminal 20a, such as automatically retouching the facial shape of the portrait, enlarging the eyes of the portrait, and making the nose bridge of the portrait high.

The shooting page 20m may further include a teleprompter shooting entry 20f. When user A is inexperienced in video recording, in order to prevent the user from forgetting words in a video recording process (another video needs to be recorded in case of forgetting words), user A may select a teleprompter shooting function in the video application. That is, user A may execute a triggering operation on the teleprompter shooting entry 20f on the shooting page 20m. The user terminal 20a may switch the shooting page 20m in the video application to a recording page corresponding to the teleprompter shooting entry 20f for displaying in response to the triggering operation of user A for the teleprompter shooting entry 20f. A text input region may be displayed first on the recording page, and user A may input a script content needed by video recording to the text input region. The script content may be used for prompting user A in the video recording process. Briefly, user A may record a video in the video recording process according to the script content displayed in the video application. In such case, the script content may also be referred to as prompting text data 20g. Statistical information 20h of the script content input by user A may further be displayed in the text input region. The statistical information 20h may include a word count of the input script content (i.e., a prompting word count, for example, the word count of the script content is 134) and an estimated video length (such as 35 seconds) corresponding to the input script content. User A may supplement or prune the script content according to the estimated video length. For example, user A wants to record a 1-minute video. When the estimated video length corresponding to the script content input by user A to the text input region is 4 minutes, user A may prune the script content displayed in the text input region such that the estimated video length corresponding to the pruned script content is about 1 minute (for example, the estimated video length may range from 55 seconds to 65 seconds). When the estimated video length corresponding to the script content input by user A to the text input region is 35 seconds, the user may supplement the script content displayed in the text input region such that the estimated video length corresponding to the supplemented script content is about 1 minute. Further, the final script content may be determined as the prompting text data 20g.

After user A determines the prompting text data 20g, user A may execute a triggering operation on a "next" control on the recording page, and the user terminal 20a may enable the camera of the user terminal 20a (or the photographic device in communication connection) in response to the triggering operation for the "next" control to enter a video recording preparation state (i.e., before the start of video recording). As shown in FIG. 2, a video image 20i collected by the user terminal 20a for user A may be displayed on the recording page, and prompting information "position your phone well, and say "start" to enable teleprompter shoot" is displayed on the recording page. That is, user A may adjust his/her own position and a position of the user terminal 20a according to the video image 20i, and after adjusting the positions, may enable video recording through a voice. For example, the user may say "start" to enable video recording.

After user A says "start", the user terminal 20a may enable video recording in the video application in response to a voice enabling operation of user A, and display the prompting text data 20g on the recording page. It can be understood that a text displayed on the recording page may be only a part of a text in the prompting text data 20g, such as a sentence in the prompting text data 20g, so that a first sentence in the prompting text data 20g may be displayed first after video recording is enabled. When user A begins to speak in the video recording process, the user terminal 20a may collect user voice data corresponding to user A. A client of the video application installed in the user terminal 20a may transmit the user voice to a backend server 20j of the video application, and send a voice matching instruction to the backend server 20j. The backend server 20j may convert the user voice into a user voice text after receiving the user voice and the voice matching instruction. When the user voice text is Chinese (the prompting text data 20g may also be Chinese by default at this point), the backend server 20j may further convert the user voice text into first Chinese pinyin (when the user voice text is Chinese, first syllable information may be referred to as first Chinese pinyin). Certainly, after user A inputs the prompting text data 20g to the text input region, the client of the video application may also transmit the prompting text data 20*g* to the backend server 20*j*, so that the backend server 20*j* may convert the prompting text data 20*g* into second Chinese pinyin (when the user voice text is Chinese, second syllable information may be referred to as second Chinese pinyin). The backend server 20*j* may match the first Chinese pin and the second Chinese pin to search the second Chinese pinyin for the same pinyin as the first Chinese pinyin, namely searching for a text position of the first Chinese pinyin in the second Chinese pinyin, and determine a text corresponding to the text position in the prompting text data 20*g* as a target text (i.e., a text matched with the user voice in the prompting text data 20*g*). The backend server 20*j* may transmit the target text to the client of the video application. The terminal device 20*a* may identify the target text in the video application (for example, increasing a display size of the target text, switching a display color of the target text, or boxing the target text with a circle or a rectangular box). It can be understood that the prompting text data may be displayed in a scrolling manner on the recording page when user A speaks according to a sequence of the prompting text data, and the prompting text data may be displayed in a jumping manner on the recording page when user A does not speak according to the sequence of the prompting text data.

When the target text is a word or phrase, a sentence where a target application is located may be identified in the video application. As shown in FIG. 2, when the user voice is "weekend", the backend server 20*j* may find the target text corresponding to the user voice in the prompting text data 20*g* by matching: weekend. In such case, a sentence "Attend the consumer class jointly organized by xx and xx in Changsha at weekends" where the target text "weekend" is located may be identified on the recording page (increasing a display size of the text, and displaying the text in bold, as shown in region 20*k* in FIG. 2).

The prompting text data 20*g* may be displayed directly on the recording page, or displayed on an independent subpage displayed on the recording page. A display form of the prompting text data 20*g* on the recording page is not limited in this application. A purpose of matching the user voice in the prompting text data 20*g* is that: when a text position of the user voice in the prompting text data 20*g* is determined, and the user voice is converted into the user voice text, it is only necessary to consider the consistency between pronunciations of words and the user voice but not the accuracy between the user voice text obtained by conversion and the user voice. Therefore, the matching efficiency of the user voice and the prompting text data may be improved by Chinese audio matching.

The user terminal 20*a* may collect the user voice of user A in real time, the target text corresponding to the user voice in the prompting text data 20*g* may be determined in real time through the backend server 20*j*, and the prompting text data may further be displayed in the scrolling manner according to a progress of the user voice. For example, when user A is saying the first sentence in the prompting text data 20*g*, the first sentence in the prompting text data 20*g* may be identified on the recording page. When user A is saying a second sentence in the prompting text data 20*g*, the first sentence in the prompting text data 20*g* may be switched to the second sentence for displaying on the recording page, and the second sentence is identified. The target text identified each time on the recording page is what user A is currently saying. When user A says a last word in the prompting text data 20*g*, the user terminal 20*a* may disable video recording, and determine a video recorded this time as a finished video. If user A is satisfied with the video recorded this time, the video may be saved. If user A is unsatisfied with the video recorded this time, user A may shoot another video. Certainly, user A may further perform editing optimization on the finished video to obtain a final recorded video, namely obtaining target video data.

In the video recording process shown in this embodiment of this application, the prompting text data may be displayed according to the progress of the user voice, so as to achieve the effect of accurately prompting words to the user to further improve the quality of the recorded video.

Figure 3:
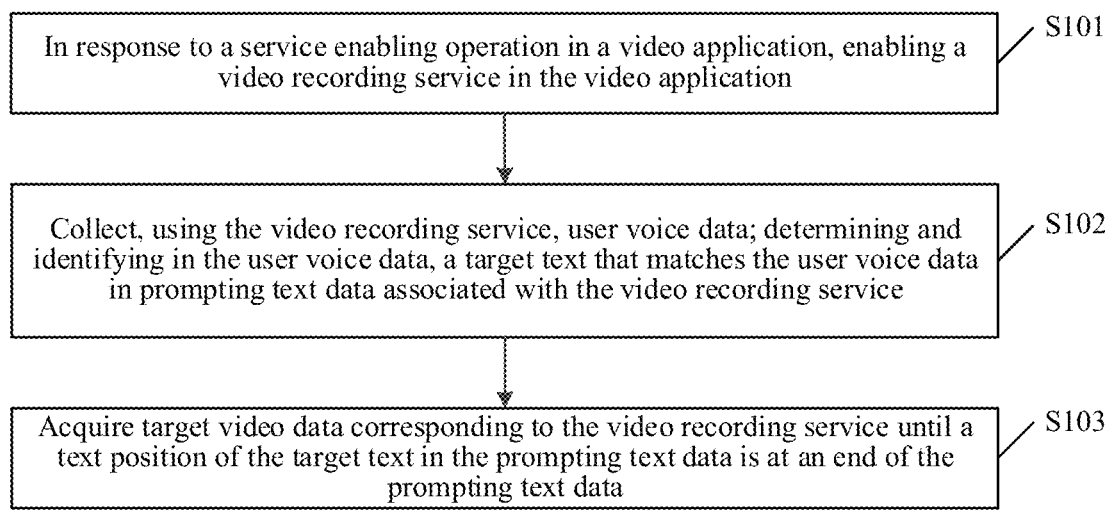
FIG. 3 is a schematic flowchart of a data processing method according to an embodiment of this application.

Referring to FIG. 3, FIG. 3 is a schematic flowchart of a data processing method according to an embodiment of this application. It can be understood that the data processing method may be performed by a computer device, which may be a user terminal, or a standalone server, or a cluster including multiple servers, or a system including a user terminal and a server, or a computer program application (including a program code), and is not particularly limited herein. As shown in FIG. 3, the data processing method may include the following S101 to S103:

S101: Enable a video recording service in a video application in response to a service enabling operation in the video application.

A user who wants to express his/her opinion or show his/her life in front of a camera may perform video recording in a video application so as to record a desired video, and upload a finally recorded video to an information posting platform for sharing such that all users of the information posting platform may view the recorded video. In this embodiment of this application, a user who needs to record a video may be referred to as a target user, and a device that the target user uses for video recording may be referred to as a computer device. When the target user executes a service enabling operation for a video recording service in a video application installed in the computer device, the computer device may enable the video recording service in the video application, namely enabling video recording in the video application, in response to the service enabling operation in the video application. The service enabling operation may include, but not limited to: a contact triggering operation such as single click, double click, long press, and tap on screen, and a non-contact triggering operation such as voice, remote control, and gesture.

Before the computer device enables the video recording service, the target user may also upload prompting text data needed in the video recording service to the video application. The prompting text data may be used for prompting the target user in the video recording service. Therefore, the condition that the target user forgets words in a video recording process may be reduced greatly. After the target user opens the video application installed in the computer device, a shooting page (such as a shooting page 20*m* in the embodiment corresponding to FIG. 2) in the video application may be entered, which may include a teleprompter shooting entry. When the target user executes a triggering operation on the teleprompter shooting entry on the shooting page, the computer device may display a recording page in the video application in response to the triggering operation for the teleprompter shooting entry in the video application. The recording page may include a text input region that may be used for editing a text content. The computer device may display, in the text input region in response to an information editing operation for the text input region, the prompting text data determined by the information editing operation. When a prompting word count corresponding to the prompting text data is greater than a count threshold (the count threshold herein may be preset as practically required to be, for example, 100), the prompting word count and an estimated video length corresponding to the prompting word count may be displayed in the text input region. In other words, after the target user executes the triggering operation on the teleprompter shooting entry on the shooting page, the shooting page is switched to the recording page for displaying in the video application, the target user may edit a script content (i.e., the above-mentioned prompting text data) needed by the video recording service in the text input region of the recording page, prompting words input to the text input region may be counted in real time when the target user edits a text in the text input region, and when the prompting word count is greater than the preset count threshold, the prompting word count and the estimated video length corresponding to the currently input prompting text data may be displayed in the text input region. The teleprompter shooting entry may be displayed on any page of the video application, in addition to the shooting page. A display position of the teleprompter shooting entry is not limited in this embodiment of this application.

The estimated video length may be used as length reference information of a finished product subsequently recorded in the video recording service. When the estimated video length displayed in the text input region differs greatly from a video length desired by the target user, the target user may supplement or prune the text in the text input region. For example, when the estimated video length displayed in the text input region is 35 seconds, and the video length desired by the target user is 2 minutes, the target user may continue text edition in the text input region until the estimated video length displayed in the text input region is within a set length range (for example, the estimated video length is between 1 minute and 50 seconds and 2 minutes and 10 seconds).

A text uploading control may further be displayed on the recording page displayed by the computer device in response to the triggering operation for the teleprompter shooting entry in the video application. The target user may execute a triggering operation on the text uploading control on the recording page to upload the edited prompting text data to the recording page. That is, the computer device may determine a text content uploaded to the recording page as the prompting text data in response to the triggering operation for the text uploading control, and display the prompting text data as well as the prompting word count corresponding to the prompting text data and the estimated video length corresponding to the prompting text data in the text input region of the recording page. Text uploading control may include, but not limited to: a paste text control and a select last text control. When the target user executes a triggering operation on the paste text control, it indicates that the target user may paste the pre-edited prompting text data directly to the text input region without temporarily editing the text content. When the target user executes a triggering operation on the select last text control, it indicates that the target user may use prompting text data in a last video recording service in the current video recording service, namely the target user may be unsatisfied with a finished video recorded in the last video recording service and needs to record another video in the current video recording service. Therefore, repeated input of the same prompting text data may be avoided, and the input efficiency of the prompting text data may further be improved.

Figure 4:
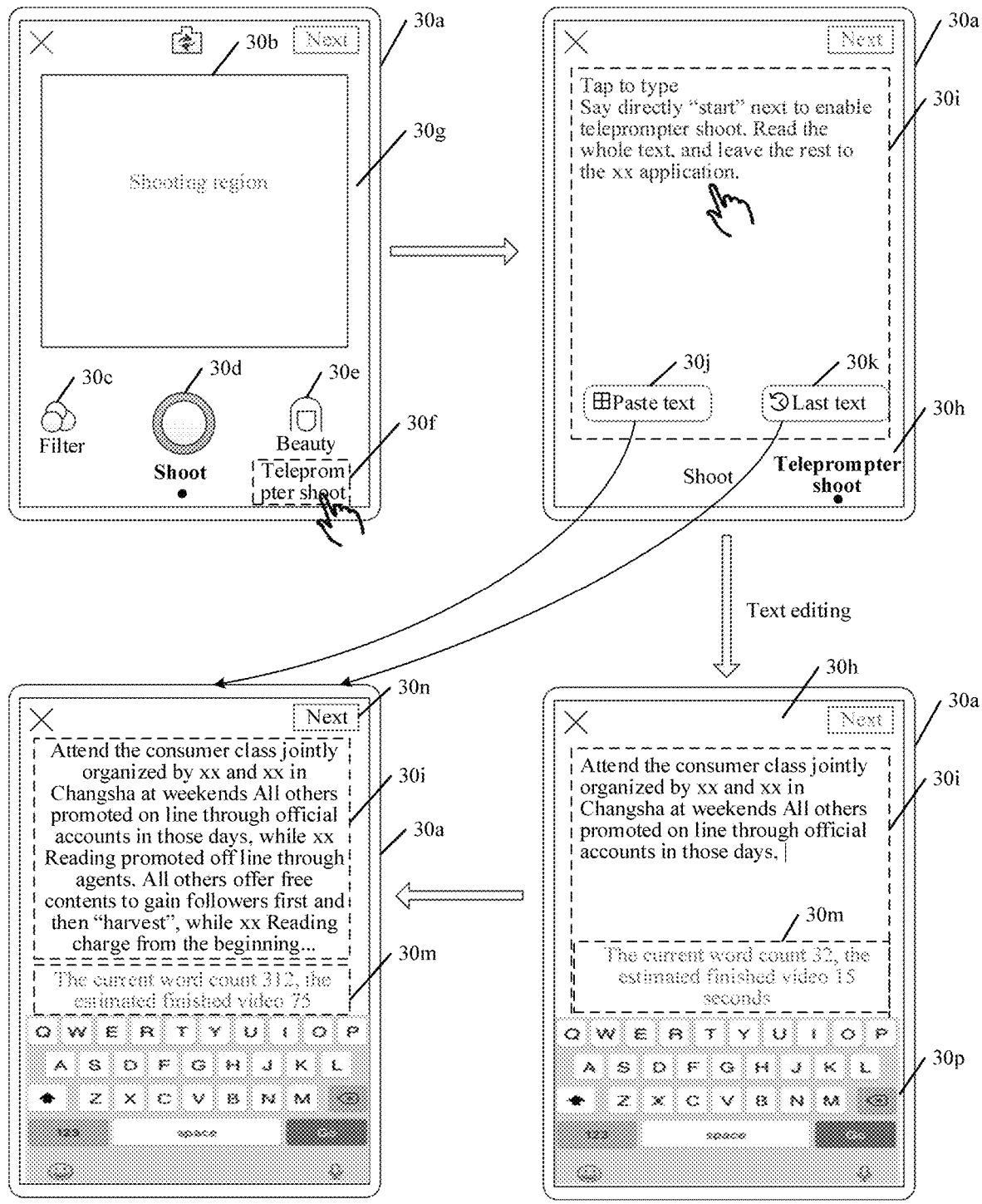
FIG. 4 is a schematic interface diagram of inputting prompting text data according to an embodiment of this application.

Referring to FIG. 4 together, FIG. 4 is a schematic interface diagram of inputting prompting text data according to an embodiment of this application. As shown in FIG. 4, after the target user executes a triggering operation on a shooting entry in a video application installed in a user terminal 30a, the user terminal 30a may display a shooting page 30g in the video application in response to the triggering operation for the shooting entry (at this point, the user terminal 30a may be the above-mentioned computer device). The shooting page 30g may include a shooting region 30b, a filter control 30c, a shooting control 30d, a beauty control 30e, a teleprompter shooting entry 30f, etc. Descriptions about functions of the shooting region 30b, the filter control 30c, the shooting control 30d, and the beauty control 30e in the video application may refer to those about the functions of the shooting region 20b, the filter control 20c, the shooting control 20d, and the beauty control 20e in the embodiment corresponding to FIG. 2. Elaborations are omitted herein.

When the target user executes a triggering operation on a teleprompter shooting entry 30f on the shooting page 30g, the user terminal 30a may switch the shooting page 30g to a recording page 30h for displaying in the video application in response to the triggering operation for the teleprompter shooting entry 30f on the shooting page 30g. The recording page 30h may include a text input region 30i. The text input region 30i may be used for directly editing a text content. The target user may tap the text input region 30i to pop up a keyboard 30p on the recording page 30h. Prompting text data needed in a current video recording service may be edited through the keyboard 30p. The user terminal 30a may display, in the text input region 30i in response to an information editing operation of the target user, a text content determined by the information editing operation as the prompting text data. Meanwhile, the user terminal 30a may statistically obtain a prompting word count of the prompting text data input to the text input region 30i in real time. When the prompting word count of the prompting text data input to the text input region 30i is greater than a preset count threshold (for example, the count threshold is set to 100), the prompting word count and an estimated finished video length (i.e., estimated video length) corresponding to the input prompting text data may be displayed in a region 30m of the text input region 30i. As shown in FIG. 4, when the target user enters a text content "Attend the consumer class jointly organized by xx and xx in Changsha at weekends" to the text input region 30i. Everyone else promoted on line through official accounts in those days" to the text input region 30i, the prompting word count statistically obtained by the user terminal 30a is 32, and the estimated finished product length is 15 seconds, namely "current word count 32, estimated finished video length 15 seconds" is displayed in the region 30m. The target user may edit the text content according to the estimated finished video length displayed in the region 30m. After the target user completes editing the text content in the text input region 30i, the text content in the text input region 30i may be determined as prompting text data. Further, a triggering operation may be executed on a "next" control 30n on the recording page 30h, so as to trigger the user terminal 30a to execute a next operation of the video recording service.

As shown in FIG. 4, the text input region 30i may further include a paste text control 30j and a last text control 30k. When the target user executes a triggering operation on the paste text control 30j, it indicates that the target user has edited the prompting text data in another application and copied the prompting text data from the other application. The user terminal 30a pastes the prompting text data copied by the target user to the text input region 30i in response to the triggering operation for the paste text control 30j. When a video recorded by the target user in the current video recording service is obtained by re-recording for a video recorded in a last video recording service, the target user may execute a triggering operation on the last text control 30k, and the user terminal 30a acquires prompting text data in the last video recording service in response to the triggering operation for the last text control 30k, displays the prompting text data in the last video recording service in the text input region 30i, and directly uses the prompting text data used in the last video recording service as prompting text data in the current video recording service. The target user may adjust the prompting text data used in the last video recording service in the text input region 30i according to an experience in the last video recording service. For example, if finding a logical error in sentence 1 in the prompting text data in the last video recording service, the target user may modify the prompting text data in the last video recording service in the text input region 30i in the current video recording service.

For the prompting text data input to the text input region 30i through the paste text control 30j and the last text control 30k, a word count and estimated finished video length corresponding to the prompting text data may also be displayed in the region 30m of the text input region 30i. In this embodiment of this application, the target user enters the prompting text data in the video recording service to the text input region 30i by use of the paste text control 30j and the last text control 30k, so that the input efficiency of the prompting text data in the video recording service may be improved.

When the service enabling operation is a voice enabling operation, the target user may execute the voice enabling operation on the video recording service in the video application after completing the editing operation for the prompting text data. The computer device may display a recording countdown animation associated with the video recording service on the recording page of the video application in response to the voice enabling operation, and enable and execute the video recording service in the video application at an end of the recording countdown animation, namely starting video recording formally. When the recording countdown animation is played on the recording page, the photographic device corresponding to the computer device may be turned on, and the target user may adjust his/her own position and the position of the computer device according to a video image displayed on the recording page, so as to find a best shooting angle. An animation cancellation control corresponding to the recording countdown animation may further be displayed on the recording page. When the target user has been prepared for video recording, a triggering operation may be executed on the animation cancellation control to cancel the recording countdown animation. That is, the computer device may cancel displaying of the recording countdown animation on the recording page in response to the triggering operation of the target user for the animation cancellation control, and enable and execute the video recording service in the video application. In other words, after the target user voice enables the video recording service through a voice, a formal recording mode may not be entered directly in the video application. Instead, the recording countdown animation is played on the recording page to leave a short period of time (i.e., length of the recording countdown animation, such as 5 seconds) for the target user to prepare for recording, and the formal recording mode may be entered after the recording countdown animation is completely played. Alternatively, if the target user is prepared ahead for recording, displaying of the recording countdown animation is canceled, and the formal recording mode is entered directly.

Figure 5:
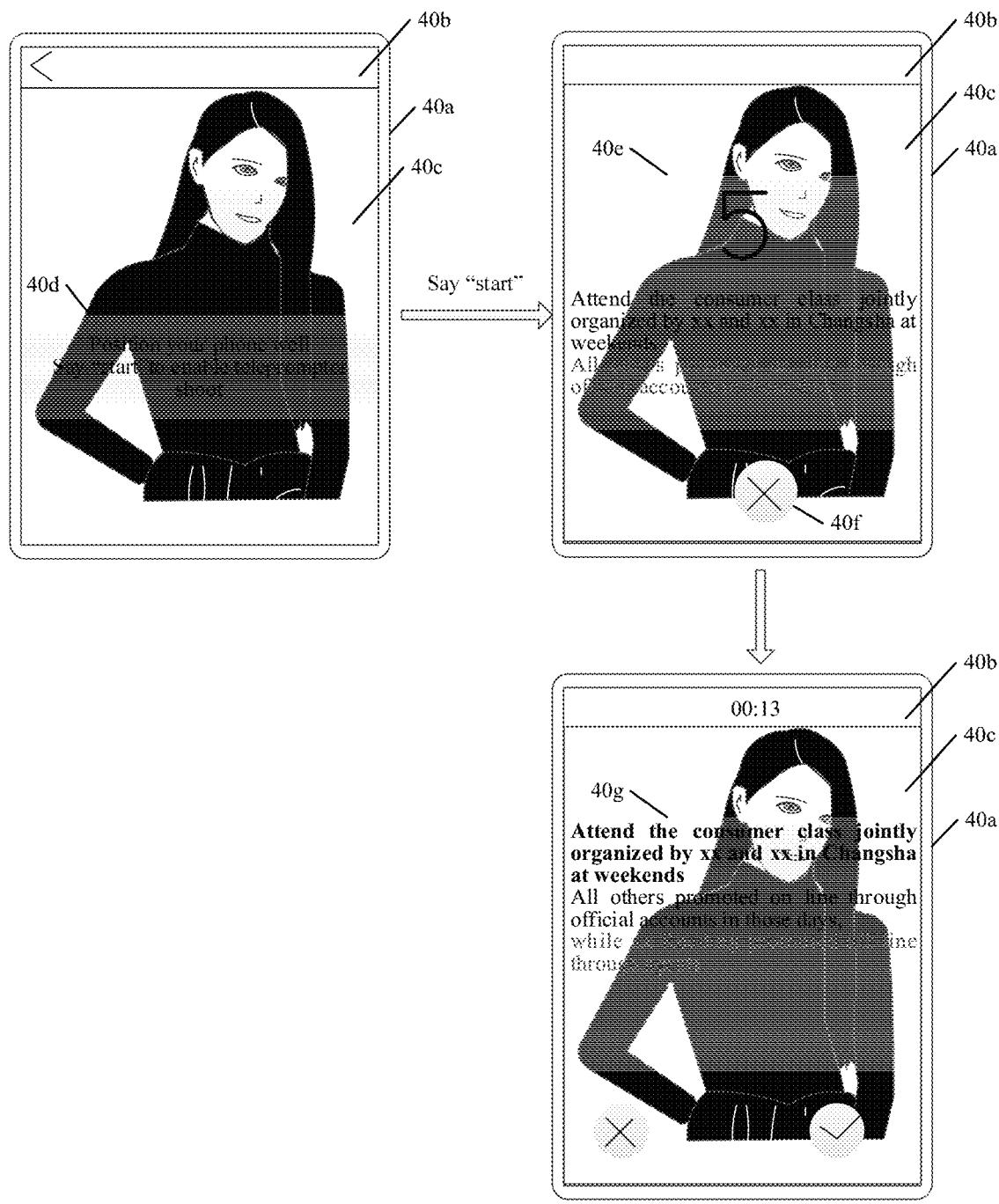
FIG. 5 is a schematic interface diagram of enabling a video recording service in a video application according to an embodiment of this application.

Referring to FIG. 5, FIG. 5 is a schematic interface diagram of enabling a video recording service in a video application according to an embodiment of this application. After completing the editing operation for the prompting text data, the target user may execute a next operation (for example, executing a triggering operation on the "next" control 30n in the embodiment corresponding to FIG. 4) to exit the text input region on the recording page. As shown in FIG. 5, after the target user completes editing the prompting text data and executes the next operation, the text input region may be exited on a recording page 40b, and a video image of the target user is displayed in a region 40c of the recording page 40b. Meanwhile, prompting information 40d ("position your phone well, and say "start" to enable teleprompter shoot") may further be displayed on the recording page 40b. That is, before the video recording service is enabled, a user terminal 40a (at this point, the user terminal 40a may be referred to as a computer device) may turn on a photographic device associated therewith (such as a camera of the user terminal 40a) to collect image data of the target user, render the collected image data into a video image corresponding to the target user, and display the video image of the target user in the region 40c of the recording page 40b. The target user may adjust his/her own position and a position of the camera according to the video image displayed in the region 40c, so as to find a best shooting angle.

After the target user adjusts his/her own position and the position of the camera, namely the target user makes all preparations for video recording, the target user may say "start" to enable the video recording service in the video application. After the target user says "start" to execute a voice enabling operation on the video recording service in the video application, the user terminal 40a may display a recording countdown animation in a region 40e of the recording page 40b in response to the voice enabling operation for the video recording service. A length of the recording countdown animation may be 5 seconds. Certainly, first few sentences of the prompting text data (such as first two sentences of the prompting text data) may further be displayed in the region 40e of the recording page 40b.

The user terminal 40a may enable and execute the video recording service in the video application at the end of the recording countdown animation on the recording page 40b. If wanting to enable the video recording service before the recording countdown animation is completely played, the target user may execute a triggering operation on an animation cancellation control 40f on the recording page 40b to cancel playing of the recording countdown animation on the recording page 40b and directly enable and execute the video recording service. After video recording is started formally, the target user may start speaking, and the user terminal 40a may collect user voice data of the target user, search the prompting text data for a target text matched with the user voice, and identify the target text (for example, enlarging the target text in bold) in a region 40g of the recording page 40b. A specific determination process of the target text will be described in the following S102.

S102: Collect user voice data in the video recording service, determine a target text matched with the user voice in prompting text data associated with the video recording service, and identify the target text.

After video recording is started formally, the computer device may enable an audio collection function to collect user voice data of the target user in the video recording service, search prompting text data for a target text matched with the user voice, and identify the target text in the prompting text data on a recording page. The computer device may collect the user voice of the target user in the video recording service in real time, perform text conversion on the user voice to determine a text position corresponding to the user voice in the prompting text data, determine the target text corresponding to the user voice according to the text position, and identify the target text on the recording page. Identifying may be implemented through, but not limited to: a text display color, a text font size, and a text background. The target text may be text data containing a user voice text. For example, the user voice text is: new year. In such case, the target text may be a complete sentence containing "New Year". For example, the target text is: In the coming year of Ox, wish you good luck.

The computer device refers to a directly collected voice as an initial user voice. That is, the computer device may collect an initial user voice in the video recording service, perform VAD on the initial user voice to obtain valid voice data in the initial user voice, and determine the valid voice data as the user voice. Then, the user voice may be converted into a user voice text, text matching is performed on the user voice text and the prompting text data associated with the video recording service, and the target text matched with the user voice text is determined in the prompting text data. The target text is identified on the recording page of the video recording service. In other words, the initial user voice collected by the computer device may include a noise in an environment where the target user is located and a pause part of the target user in a speaking process. Therefore, VAD may be performed on the initial user voice to delete a silence and noise in the initial user voice as interference information and retain the valid voice data in the initial user voice. In such case, the valid voice data may be referred to as the user voice of the target user. The computer device may convert the user voice into the user voice text through a fast speech-to-text model, compare the user voice text with the prompting text data to determine a text position of the user voice text in the prompting text data, further determine the target text corresponding to the user voice in the text data according to the text position, and identify the target text on the recording page of the video recording service.

The fast speech-to-text model refers to that, in the process of converting the user voice into a text, it is unnecessary to perform error correction on a context and consider the semantic correctness but only necessary to determine whether pronunciation of words obtained by conversion are consistent with the user voice. When determining the target text matched with the user voice in the prompting text data, the computer device may determine the target text corresponding to the user voice in the prompting text data according to a pronunciation of the user voice text and a pronunciation of the prompting text data. That is, the computer device may acquire first syllable information corresponding to the user voice text and second syllable information corresponding to the prompting text data associated with the video recording service, acquire target syllable information matching the first syllable information in the second syllable information, and determine the target text corresponding to the target syllable information in the prompting text data.

The syllable information may refer to pinyin information in Chinese, or phonetic symbol information in English, etc. When the prompting text data is Chinese, the computer device may convert the user voice text into first syllable information, convert the prompting text data into second syllable information, find a text position corresponding to the first syllable information in the second syllable information, and determine the target text corresponding to the user voice in the prompting text data according to the text position. When the prompting text data is in another language such as English, the computer device may convert the user voice text into first phonetic symbol information, convert the prompting text data into second phonetic symbol information, and further determine the target text corresponding to the user voice in the prompting text data according to the first phonetic symbol information and the second phonetic symbol information. It can be understood that, for Chinese, the same pronunciation may correspond to different characters, and thus the efficiency of determining the target text may be improved by pinyin matching. For a language (such as English) where different pronunciations correspond to different words, the computer device may directly match letters in the user voice text and letters in the prompting text data to determine the target text corresponding to the user voice in the prompting text data.

In the video recording service, a region for displaying the target text on the recording page may be set according to a terminal screen size of the computer device. For the region 40g on the recording page 40b shown in FIG. 5, a display width of the region 40g is the same as a screen width of the computer device (such as the user terminal 40a), and a display height of the region 40g is less than a screen height of the computer device. When the terminal screen size of the computer is relatively large (such as a display screen of a desktop computer), if the width of the region for displaying the target text is the same as the terminal screen width of the computer device, an action of the target user in looking at the target text in the video recording service may be recorded (for example, the target user may move from the left to right of the terminal screen when looking at the target text), resulting in unnatural action and expression of the target user in a final video and further excessively low quality of the video. Therefore, in order to ensure that the action and expression of the target user in the recorded video are natural, a text prompting region corresponding to the target text may be determined in the recording page of the video recording service according to a position of a photographic device corresponding to the computer device, and the target text is identified in the text prompting region according to the text position of the target text in the prompting text data. In other words, in the video recording service, the target user may face the camera, and when the text prompting region is in the same direction as the photographic device of the computer device, the action of the target user in the video recorded in the video recording service is natural.

Figure 6:
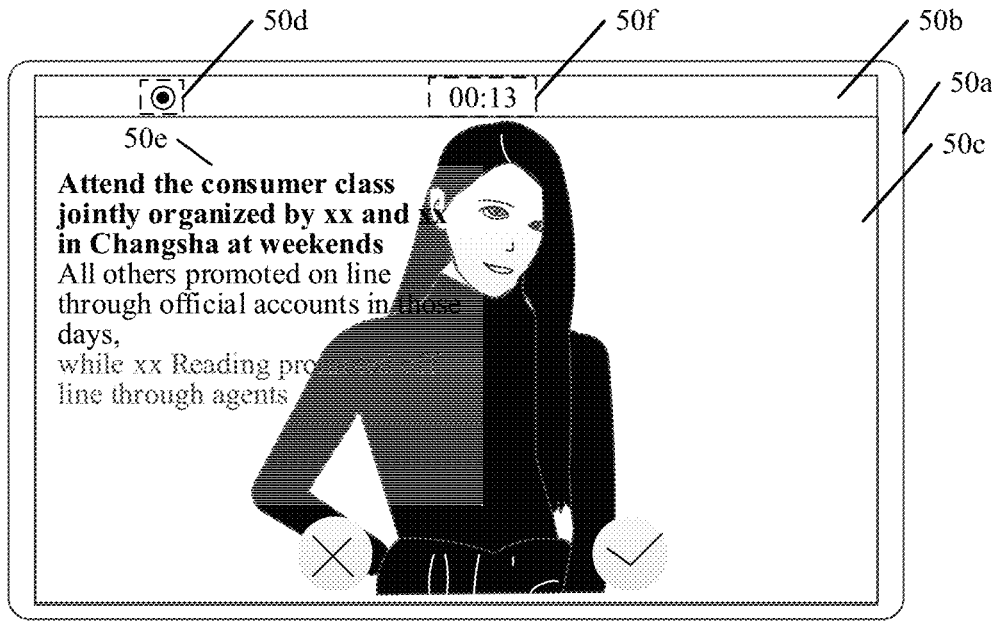
FIG. 6 is a schematic interface diagram of displaying prompting text data according to an embodiment of this application.

Referring to FIG. 6 together, FIG. 6 is a schematic interface diagram of displaying prompting text data according to an embodiment of this application. As shown in FIG. 6, after determining the target text "Attend the consumer class jointly organized by xx and xx in Changsha at weekends" corresponding to the user voice in the prompting text data, a user terminal 50a (i.e., the above-mentioned computer device) may determine a text prompting region 50e for displaying the target text on a recording page 50b of the video recording service according to a position of a camera 50d of the terminal device 50a. The text prompting region 50e is in the same direction as the camera 50d. After video recording is started formally, a video image of the target user may be displayed in a region 50c of the recording page 50b, and video recording time is displayed in a region 50f of the recording page 50b (for example, the video recording time is 00:13).

In the video recording service, the computer device may collect an initial user voice of the target user, acquire a voice length corresponding to the initial user voice and a voice word count of the initial user voice, and determine a ratio of the voice word count to the voice length as a user speech rate. When the user speech rate is greater than a speech rate threshold (the speech rate threshold may be set artificially as practically required to be, for example, 500 words per minute), speech rate prompting information may be displayed on the recording page, which may be used for prompting the target user associated with the video recording service to reduce the user speech rate. In other words, the computer device may acquire the user speech rate of the target user in real time. When the user speech rate is greater than the speech rate threshold, it indicates that the speech rate of the target user in the video recording service is too high, and the target user may be prompted to reduce the speech rate appropriately.

Figure 7:
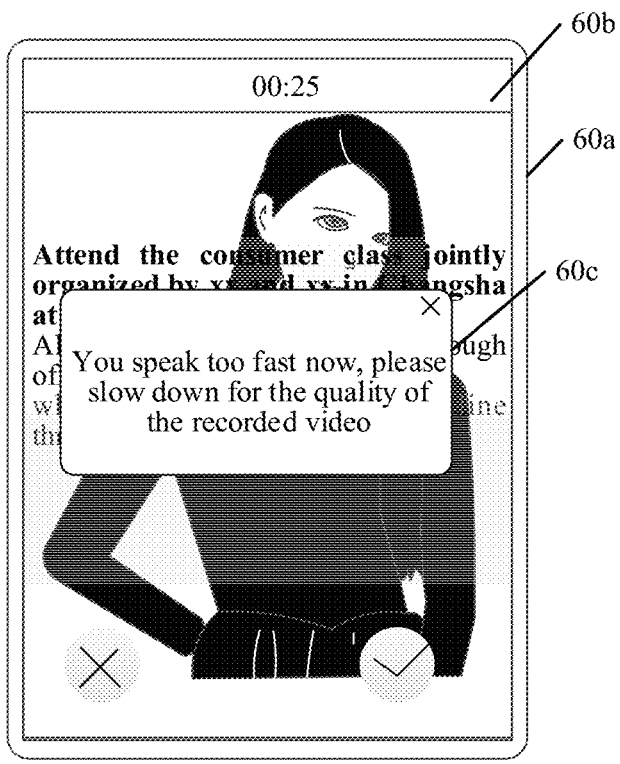
FIG. 7 is a schematic interface diagram of displaying speech rate prompting information according to an embodiment of this application.

Referring to FIG. 7 together, FIG. 7 is a schematic interface diagram of displaying speech rate prompting information according to an embodiment of this application. As shown in FIG. 7, after collecting an initial user voice of the target user, a user terminal 60a (i.e., the above-mentioned computer device) may determine a user speech rate of the target user according to a voice word count and voice length of the initial user voice. When the user speech rate of the target user in the video recording service is too high (namely greater than a speech rate threshold), speech rate prompting information 60c may be displayed on a recording page 60b of the video recording service (for example, the speech rate prompting information may be "You speak too fast now, please slow down for the quality of the recorded video"). Certainly, in practical applications, the target user may be prompted in a voice broadcast form to reduce the speech rate. A display form of the speech rate prompting information is not limited in this embodiment of this application.

In the video recording process, the recording page of the video recording service may further include a recording cancellation control and a recording complete control. After the target user executes a triggering operation on the recording cancellation control on the recording page, the computer device may cancel the video recording service in response to the triggering operation for the recording cancellation control, delete video data recorded by the video recording service, generate recording prompting information for the video recording service, and display the recording prompting information on the recording page. The recording prompting information may include a re-recording control. After the target user executes a triggering operation on the re-recording control, the computer device may switch the target text displayed on the recording page to the prompting text data for displaying in response to the triggering operation for the re-recording control. That is, the prompting text data is displayed in the text input region of the recording page, and the video recording service is re-enabled. Certainly, the recording prompting information may further include a back to home control. After the target user executes a triggering operation on the back to home control, the computer device may switch the recording page to a home page of the application for displaying in the video application in response to the triggering operation for the back to home control. That is, no more video recording service is enabled after the video recording service in execution is canceled.

After the target user executes a triggering operation on the recording complete control on the recording page, the computer device may disable the video recording service in response to the triggering operation for the recording complete control, and determine video data recorded by the video recording service as target video data that is completely recorded. That is, the video recording service is disabled before the prompting text data is finished, and a video recorded before the video recording service is disabled is referred to as target video data.

Figure 8:
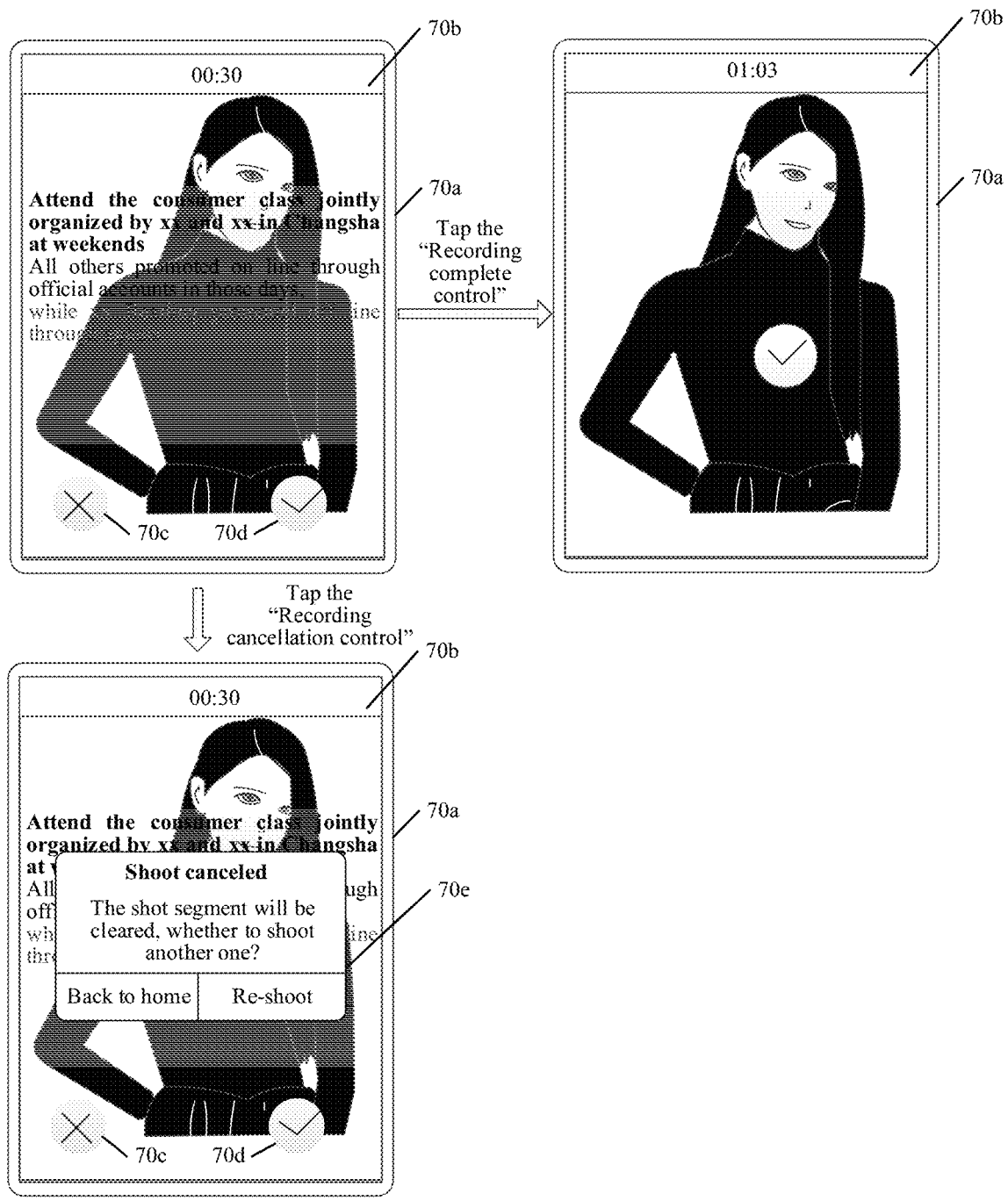
FIG. 8 is a schematic interface diagram of disabling a video recording service according to an embodiment of this application.

Referring to FIG. 8 together, FIG. 8 is a schematic interface diagram of disabling a video recording service according to an embodiment of this application. As shown in FIG. 8, a user terminal 70a (i.e., the above-mentioned computer device) may determine a target text corresponding to the user voice in the prompting text data of the video recording service according to the user voice of the target user in the video recording service, and identify the target text on a recording page 70b. That is, the user terminal 70a may display the prompting text data in a scrolling manner according to a progress of the user voice. In the video recording process, a recording cancellation control 70c and a recording complete control 70d may further be displayed on the recording page 70b. When the target user executes a triggering operation on the recording complete control 70d, the user terminal 70a may disable the video recording service in response to the triggering operation for the recording complete control 70d, and save video data recorded by the current video recording service, to complete the current video recording service. When the target user executes a triggering operation on the recording cancellation control 70c, the user terminal 70a may cancel the video recording service in response to the triggering operation for the recording cancellation control 70c, and delete video data recorded by the current video recording service. The user terminal 70a may generate recording prompting information 70e for the target user in the video recording service (for example, the recording prompting information may be "the shot segment has been cleared, shoot another segment?"), and display the recording prompting information 70e on the recording page 70b of the video recording service. The recording prompting information 70e may include a "back to home" control and a "re-shoot" control. When the target user executes a triggering operation on the "back to home" control, the user terminal 70a may exit the video recording service, and return to a home page of the video application from the recording page 70b. That is, the target user stops re-shooting. When the target user executes a triggering operation on the "re-shoot" control, the user terminal 70a may exit the video recording service, return to the text input region from the recording page 70b, and display the prompting text data in the text input region. That is, the target user selects to record another video.

S103: Acquire target video data corresponding to the video recording service until a text position of the target text in the prompting text data is at an end of the prompting text data.

In the video recording service, when the text position of the target text in the prompting text data is the end of the prompting text data, it indicates that the target user has completed the shooting work of the video recording service, and without operations of the target user, the computer device may automatically end the video recording service, save the video data recorded in the video recording service, and determine the video data recorded in the video recording service as target video data.

The computer device may determine the video data saved when the video recording service is disabled as original video data, enter an editing page of the video application, and display the original video data and an editing optimization control corresponding to the original video data on the editing page of the video application. The target user may execute a triggering operation on the editing optimization control displayed on the editing page. In such case, the computer device may display one or more (e.g., M) editing optimization modes for the original video data in response to the triggering operation for the editing optimization control. M is a positive integer. That is, M may be valued to 1, 2 . . . In this embodiment of this application, the M editing optimization modes may include, but not limited to: an editing optimization mode of removing speaking errors (which may be referred to as a first editing mode), and an editing optimization mode of removing speaking errors and pauses between sentences (which may be referred to as a second editing mode). When the target user selects a certain editing optimization mode from the M editing optimization modes, the computer device may perform, in response to a selection operation for the M editing optimization modes, an editing optimization process on the original video data according to the editing optimization mode determined by the selection operation to obtain the target video data corresponding to the video recording service. It can be understood that display regions and display sizes of the original video data and the target video data on the editing page may be adjusted as practically required. For example, the display region of the original video data (or the target video data) may be at the top of the editing page, or at the bottom of the editing page, or in the middle of the editing page. The display size of the original video data (or the target video data) may be a display ratio of 16:9 or the like.

If the editing optimization mode determined by the selection operation is the first editing mode, namely the target user selects the editing optimization mode of removing speaking errors, the computer device may acquire target voice data in the original video data, convert the target voice data into a target text result, further compare the target text result with the prompting text data, and determine any differences between the prompting text data and the target text result as an error text. Voice data corresponding to the error text is deleted from the original video data to obtain the target video data corresponding to the video recording service. When performing the editing optimization process on the original video data, the computer device may perform a text conversion process on the target voice data in the original video data by use of a precise speech-to-text model. The precise speech-to-text model may learn semantic information in the target voice data, and needs to not only consider the consistency between the pronunciation of the text obtained by conversion and the user voice but also consider the semantic information of the user voice and perform error correction on the text obtained by conversion through the semantic information of the context. The computer device may perform VAD on the target voice data in the original video data to remove a noise and silence in the original video data to obtain valid voice data in the original video data, and perform text conversion on the valid voice data by use of the precise speech-to-text model to obtain the target text result corresponding to the target voice data. Words in the target text result are compared with words in the prompting text data one by one, and a different text between the target text result and the prompting text data may further be determined as an error text. The error text herein may be generated by a speaking error of the target user in the recording process of the video recording service. The computer device may delete the voice data corresponding to the error text from the original video data to obtain the final target video data.

If the editing optimization mode determined by the selection operation is the second editing mode, namely the target user selects the editing optimization mode of removing speaking errors and pauses between sentences, the computer device may convert target voice data in the original video data into a target text result, and determine any differences between the prompting text data and the target text result as an error text. Further, the target text result is divided into one or more (e.g., N) text characters, and timestamps of the N text characters in the target voice data are acquired respectively. N is a positive integer. For example, N may be valued to 1, 2 . . . The computer device may determine a voice pause segment in the target voice data according to the timestamps, and delete the voice pause segment and voice data corresponding to the error text from the original video data to obtain the target video data corresponding to the video recording service. The process that the computer device determines the error text may refer to the descriptions when the first editing mode is selected, and will not be elaborated herein.

The process that the computer device acquires the voice pause segment may include the following operations. The computer device may perform a word segmentation process on the target text result corresponding to the target voice data to obtain the N text characters, acquire the timestamps of the text characters in the target voice data, i.e., timestamps in the original video data, and obtain a time interval between every two adjacent text characters according to the timestamps respectively corresponding to every two text characters in the N text characters. When the time interval between two adjacent text characters is greater than a time length threshold (for example, the time length threshold may be set to be 1.5 seconds), a voice segment between the two adjacent text characters is determined as a voice pause segment. The number of voice pause segments may be one, or more, or zero (namely there is no voice pause segment). For example, according to an arrangement sequence in the target text result, the N text characters may be represented as: text character 1, text character 2, text character 3, text character 4, text character 5, and text character 6. The timestamp of text character 1 in the original video data is t1, the timestamp of text character 2 in the original video data is t2, the timestamp of text character 3 in the original video data is t3, the timestamp of text character 4 in the original video data is t4, the timestamp of text character 5 in the original video data is t5, and the timestamp of text character 6 in the original video data is t6. If the computer device figures out that a time interval between text character 2 and text character 3 is greater than the time length threshold, a voice segment between text character 2 and text character 3 may be determined as voice pause segment 1. If it is figured out that a time interval between text character 5 and text character 6 is greater than the time length threshold, a voice segment between text character 5 and text character 6 may be determined as voice pause segment 2. A voice corresponding to the error text and video segments respectively corresponding to voice pause segment 1 and voice pause segment 2 are deleted from the original video data to obtain the final target video data.

Figure 9:
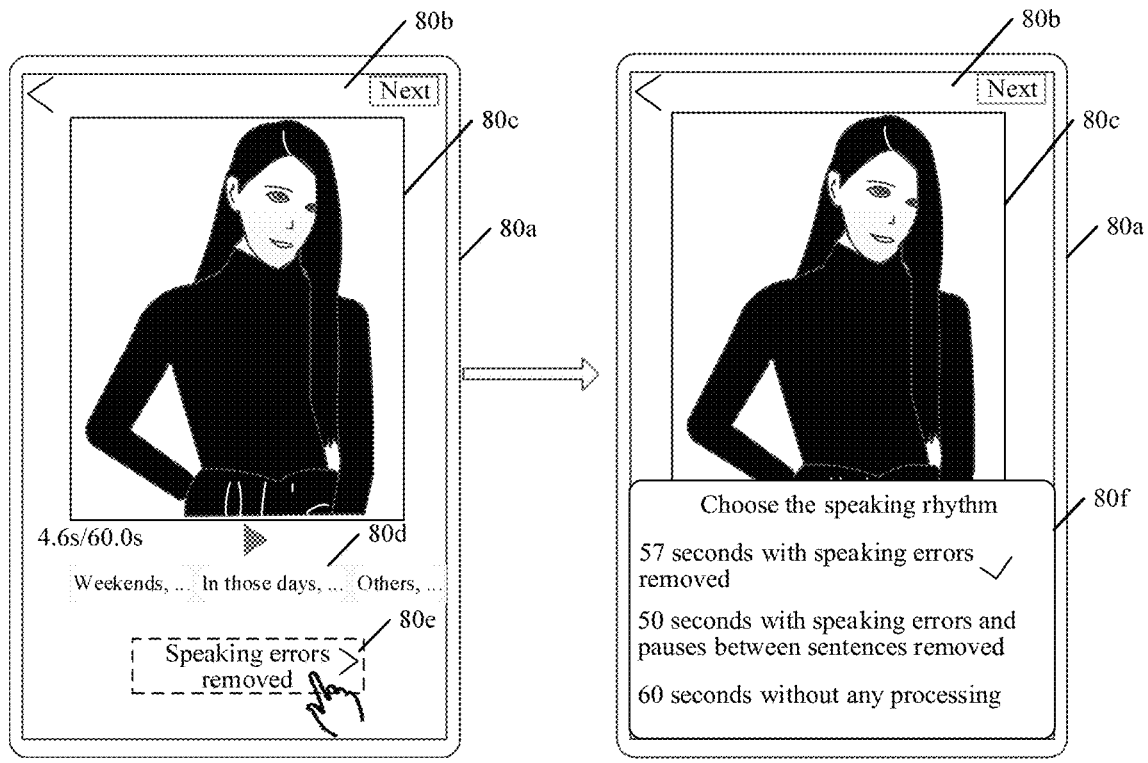
FIG. 9 is a schematic interface diagram of performing editing optimization on a recorded video according to an embodiment of this application.

Referring to FIG. 9 together, FIG. 9 is a schematic interface diagram of performing editing optimization on a recorded video according to an embodiment of this application. As shown in FIG. 9, after the video recording service is completed, an editing page 80*b* of the video application may be entered. Video data 80*c* (such as the above-mentioned original video data) recorded in the video recording service may be previewed on the editing page 80*b*. The video data 80*c* may be displayed on the editing page 80*b* according to a ratio of 16:9. A timeline 80*d* corresponding to the video data 80*c* may be displayed on the editing page 80*b*. The timeline 80*d* may include a video node in the video data 80*c*. The target user may position a playing point in the video data 80*c* quickly according to the video node in the timeline 80*d*. An editing optimization control 80*e* (also referred to as an editing optimization option button) may further be displayed on the editing page 80*b*. When the target user executes a triggering operation on the editing optimization control 80*e*, a user terminal 80*a* (i.e., the computer device) may pop up a selection page 80*f* on the editing page 80*b* in response to the triggering operation for the editing optimization control 80*e* (in this embodiment of this application, the selection page may be a certain region on the editing page, or an independent subpage displayed on the editing page, or a suspending page on the editing page, or a page overlaying the editing page. A display form of the selection page is not limited herein).

Different editing optimization modes for the video data 80*c* and video lengths respectively corresponding to different editing optimization modes may be displayed on the selection page 80*f*. As shown in FIG. 9, if the target user selects "remove speaking errors" (i.e., the above-mentioned first editing mode) on the selection page 80*f*, the video length of the video data 80*c* after editing optimization is 57 seconds (a video length of the video data 80*c* is 60 seconds). If the target user selects "remove speaking errors and pauses between sentences" (i.e., the above-mentioned second editing mode) on the selection page 80*f*, the video length of the video data 80*c* after editing optimization is 50 seconds. If the target user selects not to perform any process on the selection page 80*f*, namely retaining the video data 80*c* without any process, when the target user selects the editing optimization mode of "removing speaking errors", the user terminal 80*a* may perform a text conversion process on target voice data in the video data 80*c* to obtain a target text result corresponding to the target voice data, perform text matching on the target text result and the prompting text data to determine an error text, and delete voice data corresponding to the error text from the video data 80*c* to obtain target video data. The target video data herein refers to video data obtained after the slip of tongue is deleted. When the target user selects the editing optimization mode of "removing speaking errors and pauses between sentences", the user terminal 80*a* deletes voice data corresponding to an error text and a voice pause segment in the video data 80*c* from the video data 80*c* to further obtain target video data. The target video data herein refers to video data obtained after speaking errors and pauses between sentences are removed. After obtaining the target video data, the target user may save the target video data, or upload the target video data to an information posting platform such that all user terminals in the information posting platform may view the target video data.

The error text may include one or more (e.g., K) error subtexts. K is a positive integer. For example, K may be valued to 1, 2 . . . The computer device may determine an error frequency in the video recording service according to the K error subtexts and a video length corresponding to the original video data. When the error frequency is greater than an error threshold (for example, the error threshold may be set to two errors per minute), speech error types respectively corresponding to the K error subtexts are recognized, and a tutorial video associated with the speech error type may further be pushed to the target user associated with the video recording service in the video application. In other words, the computer device may recommend a corresponding tutorial video for the target user in the video application according to a speech error type corresponding to the error text. The speech error type includes, but not limited to: nonstandard mandarin, mispronunciation, and unclear pronunciation. For example, when the video length of the original video data is 1 minute, and the target user has three errors in the original video data, the computer device may determine speech error types of error subtexts corresponding to the three errors. If the speech error type is nonstandard mandarin, the computer device may push a mandarin tutorial video to the target user in the video application. If the speech error type is mispronunciation, the computer device may push a Chinese tutorial video to the target user in the video application. If the speech error type is unclear pronunciation, the computer device may push a dubbing tutorial video to the target user in the video application.

Figure 10:
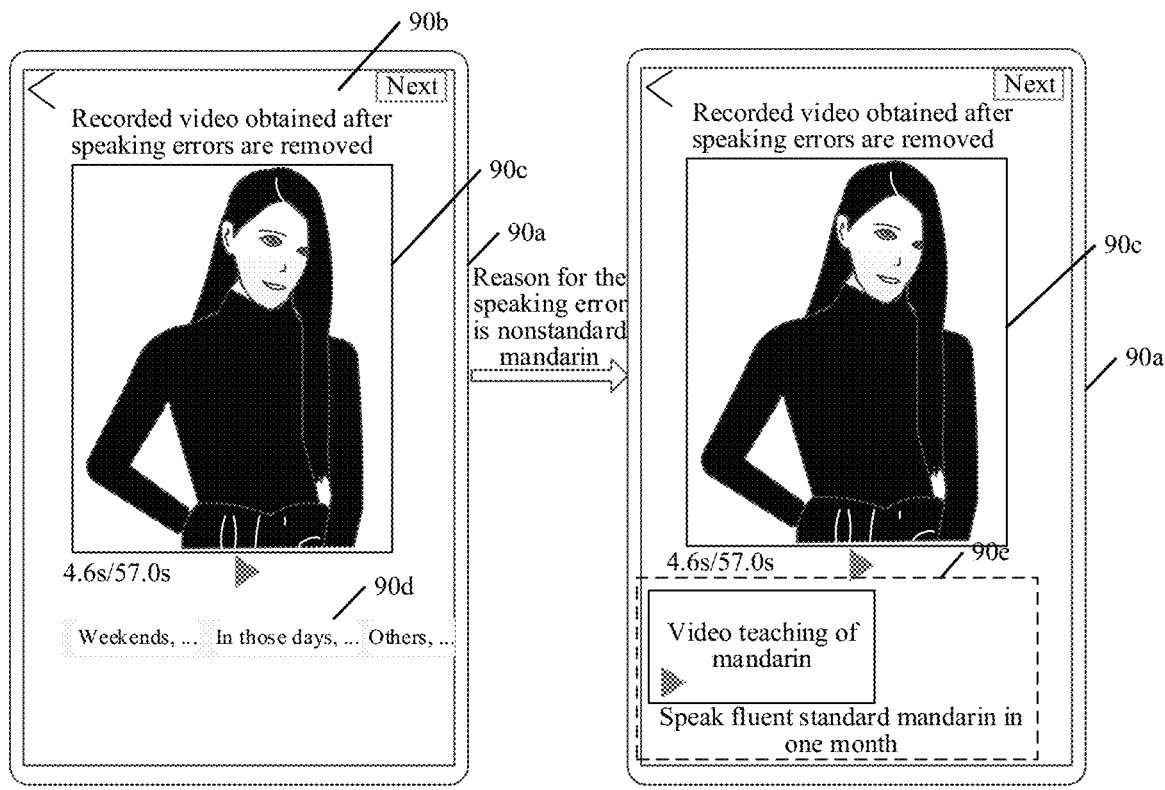
FIG. 10 is a schematic interface diagram of recommending a tutorial video according to a speech error type according to an embodiment of this application.

Referring to FIG. 10 together, FIG. 10 is a schematic interface diagram of recommending a tutorial video according to a speech error type according to an embodiment of this application. As shown in FIG. 10, if the target user selects the editing optimization mode of "removing speaking errors", editing optimization is performed on the original video data recorded in the video recording service to obtain target video data 90*c* after editing optimization (i.e., recorded video obtained after speaking errors are removed). A user terminal 90*a* (i.e., the above-mentioned computer device) may display the target video data 90*c* on an editing page 90*b*. A timeline 90*d* may further be displayed on the editing page 90*b*. The timeline 90*d* may include a video node associated with the target video data 90*c*. The video node in the timeline 90*d* may be triggered to position and play a specific time point in the target video data 90*c*. The target user may preview the target video data 90*c* on the editing page 90*b*. The user terminal 90*a* may push, according to a speech error type corresponding to an error text in an editing optimization process, a tutorial video matched with the speech error type to the target user in the video application. As shown in FIG. 10, the speech error type corresponding to the error text is nonstandard mandarin, namely a reason for a speaking error is nonstandard mandarin. In such case, the user terminal 90*a* may acquire a tutorial video for video teaching of mandarin (i.e., mandarin tutorial video) in the video application, and display the pushed mandarin tutorial video in a region 90*e* of the editing page 90*b*.

Figure 11:
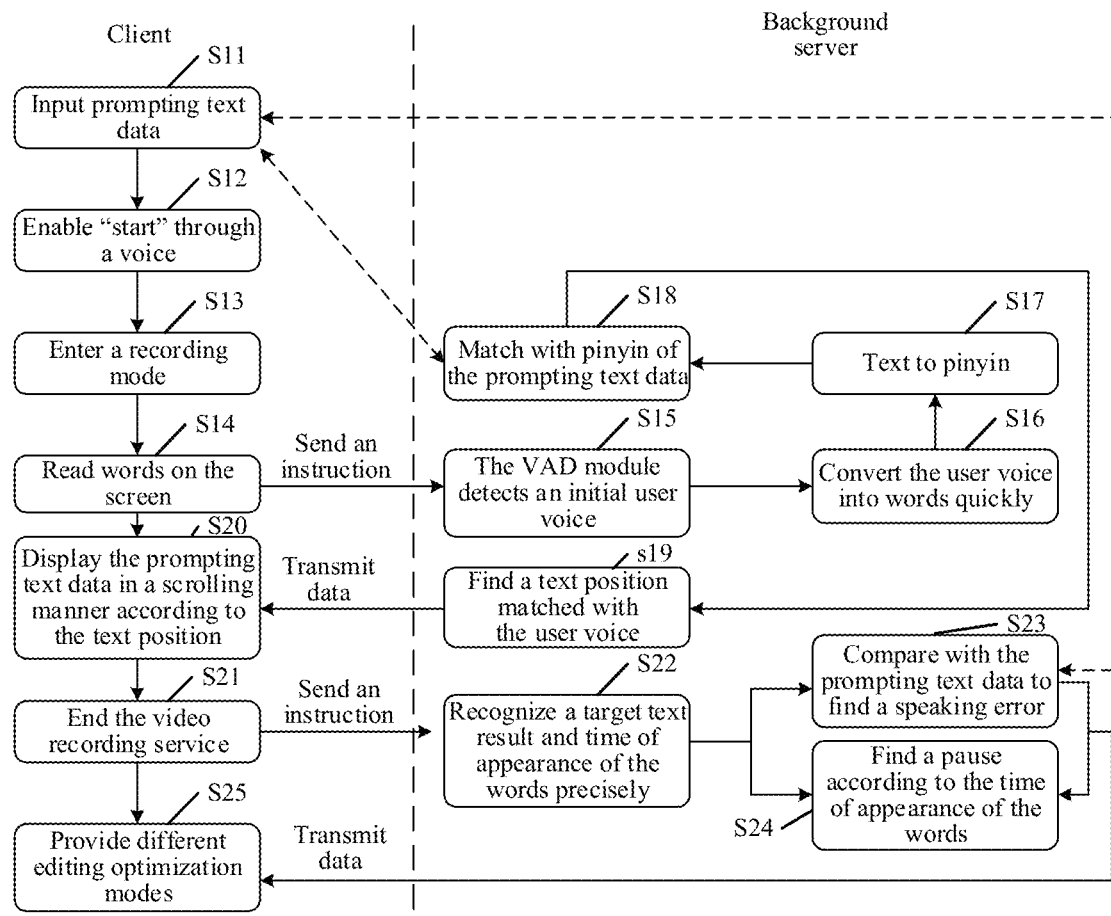
FIG. 11 is an implementation flowchart of a video recording service according to an embodiment of this application.

Referring to FIG. 11, FIG. 11 is an implementation flowchart of a video recording service according to an embodiment of this application. As shown in FIG. 11, an implementation process of a video recording service is described taking a client and backend server of a video application as an example. In such case, the client and the backend server may be referred to as computer devices. The implementation process of the video recording service may be implemented by the following S11 to S25.

In S11, prompting text data is input. That is, a target user may open the client of the video application to enter a shooting page of the client and enter a recording page from a teleprompter shooting entry of the shooting page. In such case, the recording page includes a text input region. The target user may input the prompting text data to the text input region. After completing editing the prompting text data, the target user may perform S12 to enable "start" through a voice. That is, "start" may be taken as a wakeup word. After the target user says "start", the client may perform S13 in response to a voice enabling operation of the user to enable the video recording service, namely entering a recording mode.

In S14, after the recording mode is entered, the target user may read words on a screen (the screen is a screen of a terminal device installed with the client, and at this point, the words on the screen of the terminal device may be part of a text content in the prompting text data. For example, the words displayed in the recording mode may be first two sentences in the prompting text data). The client may collect an initial user voice of the target user, transmit the initial user voice to the backend server of the video application, and send a text conversion instruction to the backend server. After receiving the initial user voice and instruction sent by the client, the backend server may perform S15 to detect the initial user voice by a VAD technology to delete a noise and silence in the initial user voice to obtain user voice data (i.e., valid voice data) corresponding to the target user. S15 may be performed by the client through a local VAD module, or by the backend server by use of the VAD technology.

In S16, the backend server may perform text conversion on the user voice by use of a fast text conversion model to convert the user voice into words (i.e., a user voice text). S17 continues to be performed to convert the user voice text (words) into pinyin (in this embodiment of this application, the prompting text data may be Chinese by default). Further, S18 may be performed, where the backend server may acquire the prompting text data input by the target user, convert the prompting text data into pinyin, and match the pinyin of the user voice text and the pinyin of the prompting text data. S19 continues to be performed to find a text position matched with the user voice in the prompting text data and transmit the text position of the user voice in the prompting text data to the client.

In S20, after receiving the text position transmitted by the backend server, the client may determine a target text corresponding to the user voice according to the text position, identify the target text on the recording page of the client, and display the prompting text data in a scrolling manner according to the text position. When the target user reads a last word in the prompting text data, the client may perform S21 to end the video recording service. Certainly, the target user may trigger a recording complete control or recording cancellation control on the recording page to end the video recording service.

After ending the video recording service, the client may transmit a recorded video (i.e., the above-mentioned original video data) corresponding to the video recording service to the backend server, and send a text conversion instruction to the backend server. After receiving the text conversion instruction, the backend server may perform S22 to perform text conversion on voice data in the recorded video by use of a precise text conversion model to convert the voice data in the recorded video into words (i.e., a target text result), and acquire time of appearance of the words in the recorded video, also referred to as timestamps of the words in the recorded video. At this point, the backend server may perform S23 and S24 in parallel.

In S23, the backend server may compare the target text result with the prompting text data to find a speaking error (i.e., the above-mentioned voice data corresponding to the error text) in the recorded video. In S24, the backend server may find a pause in the user voice in the recorded video according to the time of appearance (i.e., the timestamps) of the words in the recorded video. The backend server may transmit both the speaking error and pause in the recorded video to the client. After receiving the speaking error and pause transmitted by the backend server, the client may perform S25 to provide different editing optimization modes for the target user in the client according to the speaking error and the pause. The target user may select a proper editing optimization mode from multiple editing optimization modes provided by the client. The client may perform editing optimization on the recorded video based on the editing optimization mode selected by the target user to obtain final target video data.

In this embodiment of this application, a user may enable a video recording service through a voice after inputting prompting text data in a video application, and a teleprompter function is provided for the user in a recording process of the video recording service. A target text matched with the user voice in the prompting text data may be positioned, and the target text is identified in the video application, namely the target text displayed in the video application is matched with what the user is saying. Therefore, the effectiveness of a text prompting function in the video recording service may be improved, the risk of recording failure caused by the fact that the user forgets the words may be reduced, and the quality of the recorded video may further be improved. The video recording service is enabled or disabled through the user voice, so that user operations in the video recording service may be reduced, and the video recording effect may be improved. After the video recording service ends, a recorded video in the video recording service may be automatically edited and optimized, so that the quality of the recorded video may further be improved.

Figure 12:
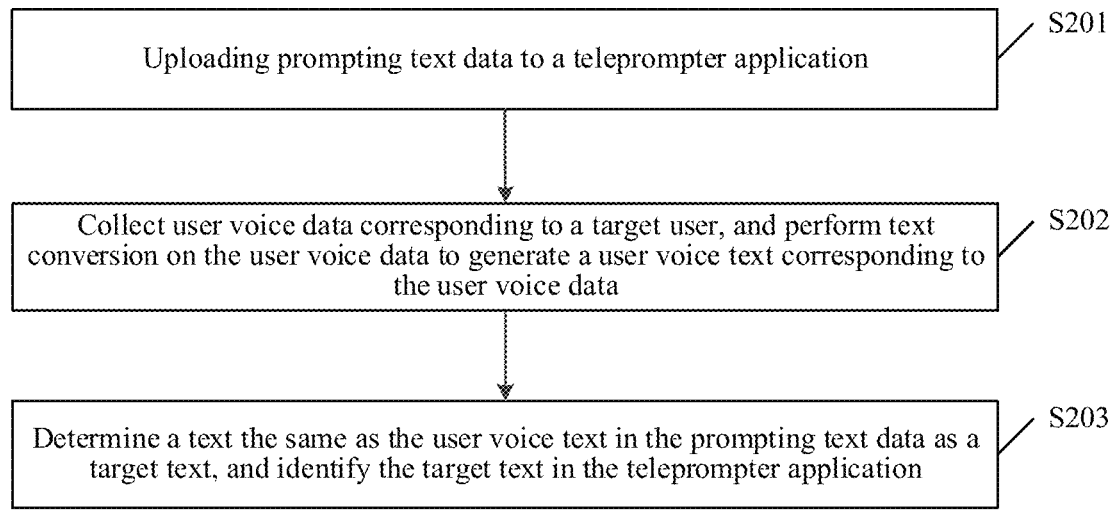
FIG. 12 is a schematic flowchart of a data processing method according to an embodiment of this application.

Referring to FIG. 12, FIG. 12 is a schematic flowchart of a data processing method according to an embodiment of this application. It can be understood that the data processing method may be performed by a computer device, which may be a user terminal, or a standalone server, or a cluster including multiple servers, or a system including a user terminal and a server, or a computer program application (including a program code), and is not particularly limited herein. As shown in FIG. 12, the data processing method may include the following S201 to S203:

S201: Upload prompting text data to a teleprompter application.

A target user may input prompting text data to a teleprompter application, or upload edited prompting text data to the teleprompter application. The computer device may upload the prompting text data to the teleprompter application in response to a text input operation or text uploading operation of the target user. That is, when a teleprompter function provided by the teleprompter application is used, the prompting text data needs to be uploaded to the teleprompter application. The computer device in this embodiment of this application may be a device installed with the teleprompter application, or referred to as a teleprompter.

S202: Collect user voice data corresponding to a target user, and perform text conversion on the user voice to generate a user voice text corresponding to the user voice.

The computer device may collect an initial user voice of the target user, perform VAD on the initial user voice to delete a noise and silence in the initial user voice to obtain user voice data (i.e., valid voice data in the initial user voice) corresponding to the target user, and perform text conversion on the user voice to generate a user voice text corresponding to the user voice.

S203: Determine a text matching the user voice text in the prompting text data as a target text, and identify the target text in the teleprompter application.

The computer device may convert the user voice text into first syllable information, convert the prompting text data into second syllable information, compare the first syllable information with the second syllable information to determine a text position of the user voice text in the prompting text data, determine a target text matched with the user voice in the prompting text data according to the text position, and identify the target text in the teleprompter application. More detailed descriptions about S202 and S203 may refer to S102 in the embodiment corresponding to FIG. 3, and elaborations are omitted herein.

There may be one or more target users, and different target users may correspond to different prompting text data. When there is one target user, determination and display processes of the target text in the teleprompter application may refer to S102 in the embodiment corresponding to FIG. 3. When there are multiple target users, the computer device, after collecting user voice data, may perform voiceprint recognition on the user voice, determine a user identity corresponding to the collected user voice according to a voiceprint recognition result, determine a target text corresponding to the user voice in prompting text data corresponding to the user identity, and identify the target text in the teleprompter application. Voiceprint recognition may refer to extracting a voiceprint feature (such as a spectrum, a cepstrum, a formant, a pitch, and a reflection coefficient) in user voice data and recognizing the voiceprint feature to determine the user identity corresponding to the user voice. Therefore, voiceprint recognition may also be referred to as speaker recognition.

Descriptions will now be described taking the condition that there are two target users as an example, namely the target user includes a first user and a second user. In such case, the prompting text data includes a first prompting text corresponding to the first user and a second prompting text corresponding to the second user. The computer device may acquire a user voiceprint feature in the voice user, and determines a user identity corresponding to the user voice according to the user voiceprint feature. In a case that the user identity is the first user, a text matching the user voice text in the first prompting text is determined as the target text, and the target text is identified in the teleprompter application. In a case that the user identity is the second user, a text matching the user voice text in the second prompting text is determined as the target text, and the target text is identified in the teleprompter application. In other words, when there are multiple target users, the user identity corresponding to the user voice needs to be determined first, the target text matched with the user voice in the prompting text data corresponding to the user identity may further be determined, and the target text is identified. Therefore, the effectiveness of the teleprompter function in the teleprompter application may be improved.

Figure 13:
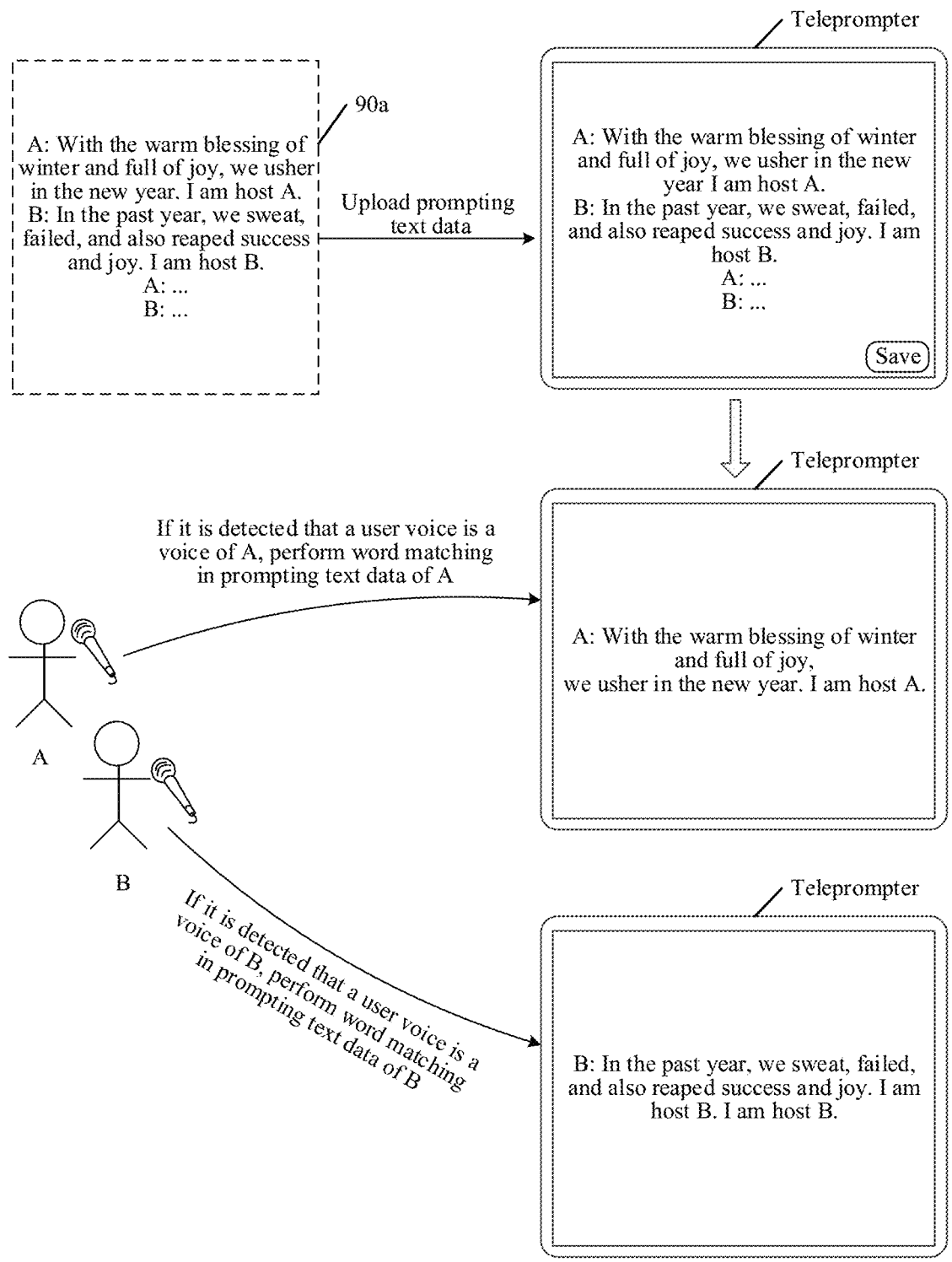
FIG. 13 is a schematic diagram of an application scenario of a teleprompter according to an embodiment of this application.

Referring to FIG. 13, FIG. 13 is a schematic diagram of an application scenario of a teleprompter according to an embodiment of this application. A data processing process is described taking a teleprompter scenario of a party as an example. As shown in FIG. 13, words 90a (i.e., prompting text data) of a host in the party may be pre-edited, and the words 90a are uploaded to a teleprompter (which may be understood as a device where the above-mentioned teleprompter application is located, and may provide a teleprompter function for the host). The words 90a may include words of host A and host B. After receiving the words 90a, the teleprompter may save the words 90a locally. When the party is in progress, the teleprompter may collect voice data of both hosts in real time. When collecting user voice data of the host, the teleprompter may perform voiceprint recognition on the user voice to determine a user identity corresponding to the user voice according to a voiceprint recognition result. When the user identity corresponding to the collected user voice is A, the teleprompter may search the words of host A for a target text matched with the collected user voice (for example, "With the warm blessing of winter and full of joy"), and "With the warm blessing of winter and full of joy" is identified in the teleprompter.

When the user identity corresponding to the collected user voice is B, the teleprompter may search the words of host A for a target text matched with the collected user voice (for example, "In the past year, we sweat"), and "In the past year, we sweat" is identified in the teleprompter.

In this embodiment of this application, the teleprompter may identify a sentence that the target user is reading, a voice of the target user may be recognized automatically with the reading of the target user, and the prompting text data is displayed in a scrolling manner in the teleprompter. Therefore, the effectiveness of a text prompting function in the teleprompter may be improved.

Figure 14:
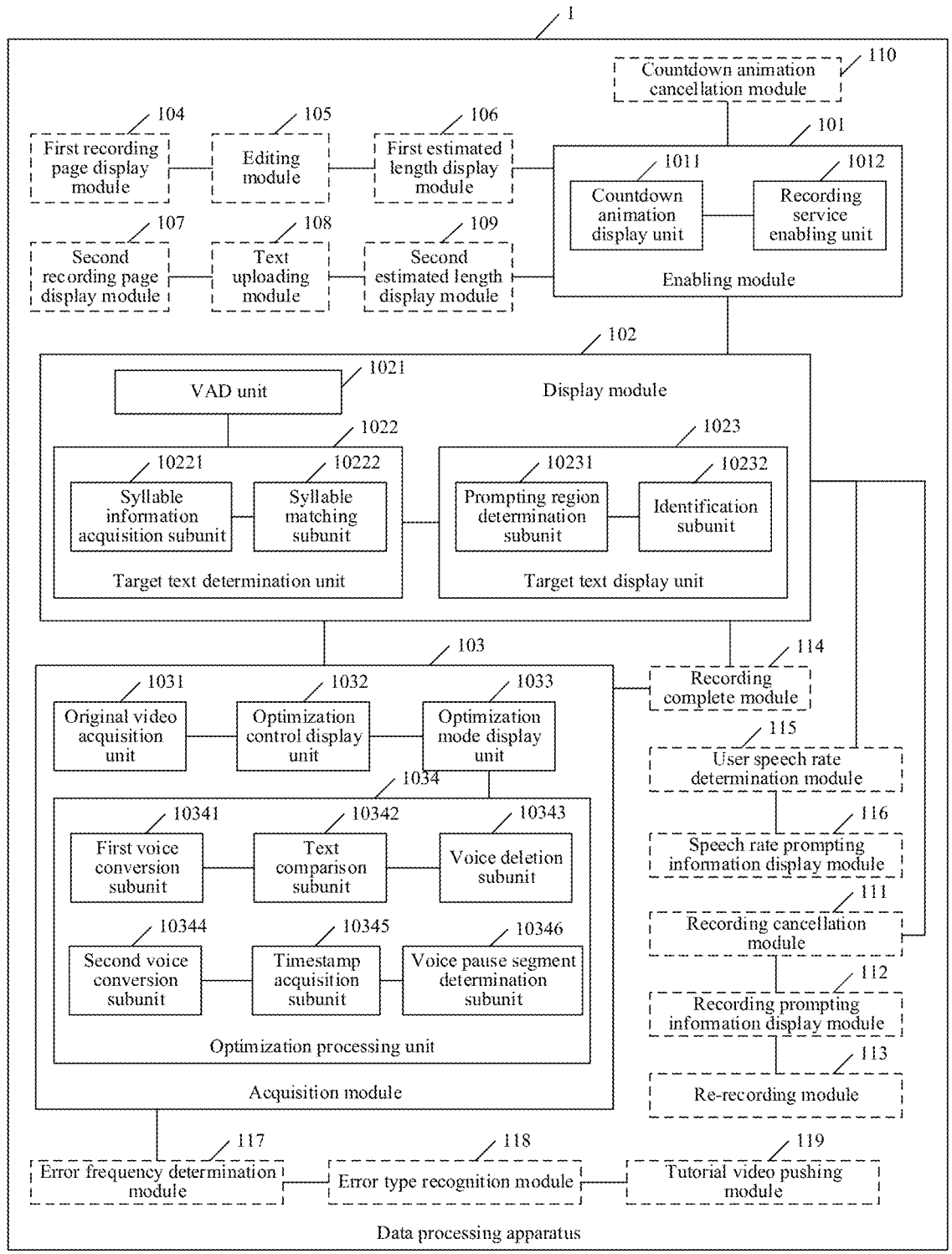
FIG. 14 is a schematic structural diagram of a data processing apparatus according to an embodiment of this application.

Referring to FIG. 14, FIG. 14 is a schematic structural diagram of a data processing apparatus according to an embodiment of this application. The data processing apparatus may perform the steps in the embodiment corresponding to FIG. 3. As shown in FIG. 14, the data processing apparatus 1 may include: an enabling module 101, a display module 102, and an acquisition module 103.

The enabling module 101 is configured to enable a video recording service in a video application in response to a service enabling operation in the video application.

The display module 102 is configured to collect user voice data in the video recording service, determine a target text matched with the user voice in prompting text data associated with the video recording service, and identify the target text.

The acquisition module 103 is configured to acquire target video data corresponding to the video recording service until a text position of the target text in the prompting text data is at an end of the prompting text data.

Specific implementation modes of the functions of the enabling module 101, the display module 102, and the acquisition module 103 may refer to steps S101 to S103 in the embodiment corresponding to FIG. 3, and will not be elaborated herein.

In some possible implementation modes, the data processing apparatus 1 may further include: a first recording page display module 104, an editing module 105, a first estimated length display module 106, a second recording page display module 107, a text uploading module 108, and a second estimated length display module 109.

The first recording page display module 104 is configured to display a recording page in the video application in response to a triggering operation for a teleprompter shooting entry in the video application before the video recording service in the video application is enabled, the recording page including a text input region.

The editing module 105 is configured to display, in the text input region in response to an information editing operation for the text input region, the prompting text data determined by the information editing operation.

The first estimated length display module 106 is configured to display, in the text input region, in accordance with a determination that a prompting word count corresponding to the prompting text data is greater than a count threshold, the prompting word count and an estimated video length corresponding to the prompting text data.

The second recording page display module 107 is configured to display a recording page in the video application in response to a triggering operation for a teleprompter shooting entry in the video application before the video recording service in the video application is enabled, the recording page including a text uploading control and a text input region.

The text uploading module 108 is configured to determine a text content uploaded to the recording page as the prompting text data in response to a triggering operation for the text uploading control, and display the prompting text data in the text input region.

The second estimated length display module 109 is configured to display a prompting word count corresponding to the prompting text data and an estimated video length corresponding to the prompting text data.

Specific implementation modes of the functions of the first recording page display module 104, the editing module 105, the first estimated length display module 106, the second recording page display module 107, the text uploading module 108, and the second estimated length display module 109 may refer to S101 in the embodiment corresponding to FIG. 3, and will not be elaborated herein. When the first recording page display module 104, the editing module 105, and the first estimated length display module 106 execute corresponding operations, the second recording page display module 107, the text uploading module 108, and the second estimated length display module 109 suspend operations. When the second recording page display module 107, the text uploading module 108, and the second estimated length display module 109 execute corresponding operations, the first recording page display module 104, the editing module 105, and the first estimated length display module 106 suspend operations. The first recording page display module 104 and the second recording page display module 107 can be combined into the same recording page display module. The first estimated length display module 106 and the second estimated length display module 109 may be combined into the same estimated length display module.

In some possible implementation modes, the service enabling operation includes a voice enabling operation.

The enabling module 101 may include: a countdown animation display unit 1011 and a recording service enabling unit 1012.

The countdown animation display unit 1011 is configured to display a recording countdown animation associated with the video recording service on a recording page of the video application in response to the voice enabling operation in the video application.

The recording service enabling unit 1012 is configured to enable and execute the video recording service in the video application at an end of the recording countdown animation.

Specific implementation modes of the functions of the countdown animation display unit 1011 and the recording service enabling unit 1012 may refer to S101 in the embodiment corresponding to FIG. 3, and will not be elaborated herein.

In some possible implementation modes, the recording countdown animation includes an animation cancellation control.

The data processing apparatus 1 may further include: a countdown animation cancellation module 110.

The countdown animation cancellation module 110 is configured to, before the video recording service in the video application is enabled and executed at the end of the recording countdown animation, cancel displaying of the recording countdown animation in response to a triggering operation for the animation cancellation control, and enable and execute the video recording service in the video application.

A specific implementation mode of the function of the countdown animation cancellation module 110 may refer to S101 in the embodiment corresponding to FIG. 3, and will not be elaborated herein.

In some possible implementation modes, the display module 102 may include: a VAD unit 1021, a target text determination unit 1022, and a target text display unit 1023.

The VAD unit 1021 is configured to collect an initial user voice in the video recording service, perform VAD on the initial user voice to obtain valid voice data in the initial user voice, and determine the valid voice data as the user voice.

The target text determination unit 1022 is configured to convert the user voice into a user voice text, and perform text matching on the user voice text and the prompting text data associated with the video recording service to determine the target text matched with the user voice text in the prompting text data.

The target text display unit 1023 is configured to identify the target text on the recording page of the video recording service.

Specific implementation modes of the functions of the VAD unit 1021, the target text determination unit 1022, and the target text display unit 1023 may refer to S102 in the embodiment corresponding to FIG. 3, and will not be elaborated herein.

In some possible implementation modes, the target text determination unit 1022 may include: a syllable information acquisition subunit 10221 and a syllable matching subunit 10222.

The syllable information acquisition subunit 10221 is configured to acquire first syllable information of the user voice text, and acquire second syllable information of the prompting text data associated with the video recording service.

The syllable matching subunit 10222 is configured to acquire target syllable information matching the first syllable information in the second syllable information, and determine the target text corresponding to the target syllable information in the prompting text data.

Specific implementation modes of the functions of the syllable information acquisition subunit 10221 and the syllable matching subunit 10222 may refer to S102 in the embodiment corresponding to FIG. 3, and will not be elaborated herein.

In some possible implementation modes, the target text display unit 1023 may include: a prompting region determination subunit 10231 and an identification subunit 10232.

The prompting region determination subunit 10231 is configured to determine a text prompting region corresponding to the target text on the recording page of the video recording service.

The identification subunit 10232 is configured to identify the target text in the text prompting region according to the text position of the target text in the prompting text data.

Specific implementation modes of the functions of the prompting region determination subunit 10231 and the identification subunit 10232 may refer to S102 in the embodiment corresponding to FIG. 3, and will not be elaborated herein.

In some possible implementation modes, the recording page includes a recording cancellation control.

The data processing apparatus 1 may further include: a recording cancellation module 111, a recording prompting information display module 112, and a re-recording module 113.

The recording cancellation module 111 is configured to cancel the video recording service in response to a triggering operation for the recording cancellation control, and delete video data recorded by the video recording service.

The recording prompting information display module 112 is configured to generate recording prompting information for the video recording service, and display the recording prompting information on the recording page, the recording prompting information including a re-recording control.

The re-recording module 113 is configured to switch the target text displayed on the recording page to the prompting text data for displaying in response to a triggering operation for the re-recording control.

Specific implementation modes of the functions of the recording cancellation module 111, the recording prompting information display module 112, and the re-recording module 113 may refer to S102 in the embodiment corresponding to FIG. 3, and will not be elaborated herein.

In some possible implementation modes, the recording page includes a recording complete control.

The data processing apparatus 1 may include: a recording complete module 114.

The recording complete module 114 is configured to, before the target video data corresponding to the video recording service is acquired in a case that the text position of the target text in the prompting text data is the end of the prompting text data, disable the video recording service in response to a triggering operation for the recording complete control, and determine video data recorded by the video recording service as the target video data.

A specific implementation mode of the function of the recording complete module 114 may refer to S102 in the embodiment corresponding to FIG. 3, and will not be elaborated herein.

In some possible implementation modes, the acquisition module 103 may include: an original video acquisition unit 1031, an optimization control display unit 1032, an optimization mode display unit 1033, and an optimization processing unit 1034.

The original video acquisition unit 1031 is configured to disable the video recording service in a case that the text position of the target text in the prompting text data is the end of the prompting text data, and determine video data recorded by the video recording service as original video data.

The optimization control display unit 1032 is configured to display the original video data and an editing optimization control corresponding to the original video data on an editing page of the video application.

The optimization mode display unit 1033 is configured to display one or more (e.g., M) editing optimization modes for the original video data in response to a triggering operation for the editing optimization control, M being a positive integer.

The optimization processing unit 1034 is configured to perform, in response to a selection operation for the M editing optimization modes, an editing optimization process on the original video data according to the editing optimization mode determined by the selection operation to obtain the target video data.

Specific implementation modes of the functions of the original video acquisition unit 1031, the optimization control display unit 1032, the optimization mode display unit 1033, and the edge optimization processing unit 1034 may refer to S103 in the embodiment corresponding to FIG. 3, and will not be elaborated herein.

In some possible implementation modes, the optimization processing unit 1034 may include: a first voice conversion subunit 10341, a text comparison subunit 10342, a voice deletion subunit 10343, a second voice conversion subunit 10344, a timestamp acquisition subunit 10345, and a voice pause segment determination subunit 10346.

The first voice conversion subunit 10341 is configured to acquire target voice data in the original video data in a case that the editing optimization mode determined by the selection operation is a first editing mode, and convert the target voice data into a target text result.

The text comparison subunit 10342 is configured to compare the target text result and the prompting text data, and determine any differences between the prompting text data and the target text result as an error text.

The voice deletion subunit 10343 is configured to delete voice data corresponding to the error text from the original video data to obtain the target video data.

The second voice conversion subunit 10344 is configured to convert target voice data in the original video data into a target text result in a case that the editing optimization mode determined by the selection operation is a second editing mode, and determine any differences between the prompting text data and the target text result as an error text.

The timestamp acquisition subunit 10345 is configured to divide the target text result into one or more (e.g., N) text characters, and acquire timestamps of the N text characters in the target voice data respectively, N being a positive integer.

The voice pause segment determination subunit 10346 is configured to determine a voice pause segment in the target voice data according to the timestamps, and delete the voice pause segment and voice data corresponding to the error text from the original video data to obtain the target video data.

Specific implementation modes of the functions of the first voice conversion subunit 10341, the text comparison subunit 10342, the voice deletion subunit 10343, the second voice conversion subunit 10344, the timestamp acquisition subunit 10345, and the voice pause segment determination subunit 10346 may refer to S103 in the embodiment corresponding to FIG. 3, and will not be elaborated herein. When the first voice conversion subunit 10341, the text comparison subunit 10342, and the voice deletion subunit 10343 execute corresponding operations, the second voice conversion subunit 10344, the timestamp acquisition subunit 10345, and the voice pause segment determination subunit 10346 suspend operations. When the second voice conversion subunit 10344, the timestamp acquisition subunit 10345, and the voice pause segment determination subunit 10346 execute corresponding operations, the first voice conversion subunit 10341, the text comparison subunit 10342, and the voice deletion subunit 10343 suspend operations.

In some possible implementation modes, the data processing apparatus 1 may further include: a user speech rate determination module 115 and a speech rate prompting information display module 116.

The user speech rate determination module 115 is configured to acquire a voice length corresponding to the initial user voice and a voice word count of the initial user voice, and determine a ratio of the voice word count to the voice length as a user speech rate.

The speech rate prompting information display module 116 is configured to display speech rate prompting information on the recording page in a case that the user speech rate is greater than a speech rate threshold, the speech rate prompting information being used for prompting a target user associated with the video recording service to reduce the user speech rate.

Specific implementation modes of the functions of the user speech rate determination module 115 and the speech rate prompting information display module 116 may refer to S102 in the embodiment corresponding to FIG. 3, and will not be elaborated herein.

In some possible implementation modes, the error text includes one or more (e.g., K) error subtexts, K being a positive integer.

The data processing apparatus 1 may further include: an error frequency determination module 117, an error type recognition module 118, and a tutorial video pushing module 119.

The error frequency determination module 117 is configured to determine an error frequency in the video recording service according to the K error subtexts and a video length corresponding to the original video data.

The error type recognition module 118 is configured to recognize speech error types respectively corresponding to the K error subtexts in a case that the error frequency is greater than an error threshold.

The tutorial video pushing module 119 is configured to push, in the video application, a tutorial video associated with the speech error type to a target user associated with the video recording service.

Specific implementation modes of the functions of the error frequency determination module 117, the error type recognition module 118, and the tutorial video pushing module 119 may refer to S103 in the embodiment corresponding to FIG. 3, and will not be elaborated herein.

In this embodiment of this application, a user may enable a video recording service through a voice after inputting prompting text data in a video application, and a teleprompter function is provided for the user in a recording process of the video recording service. A target text matched with the user voice in the prompting text data may be positioned, and the target text is identified in the video application, namely the target text displayed in the video application is matched with what the user is saying. Therefore, the effectiveness of a text prompting function in the video recording service may be improved, the risk of recording failure caused by the fact that the user forgets the words may be reduced, and the quality of the recorded video may further be improved. The video recording service is enabled or disabled through the user voice, so that user operations in the video recording service may be reduced, and the video recording effect may be improved. After the video recording service ends, a recorded video in the video recording service may be automatically edited and optimized, so that the quality of the recorded video may further be improved.

Figure 15:
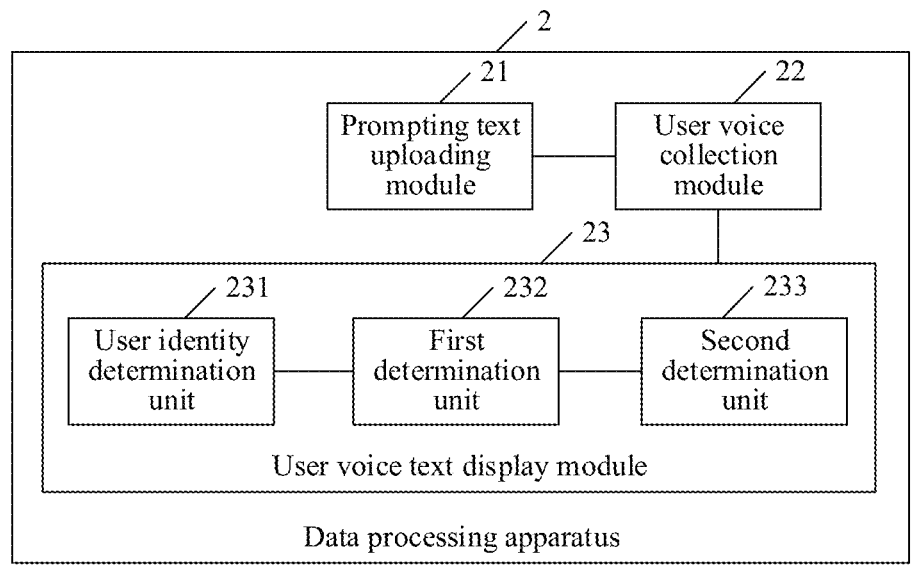
FIG. 15 is a schematic structural diagram of a data processing apparatus according to an embodiment of this application.

Referring to FIG. 15, FIG. 15 is a schematic structural diagram of a data processing apparatus according to an embodiment of this application. The data processing apparatus may perform the steps in the embodiment corresponding to FIG. 12. As shown in FIG. 15, the data processing apparatus 2 may include: a prompting text uploading module 21, a user voice collection module 22, and a user voice text display module 23.

The prompting text uploading module 21 is configured to upload prompting text data to a teleprompter application.

The user voice collection module 22 is configured to collect user voice data corresponding to a target user, and perform text conversion on the user voice to generate a user voice text corresponding to the user voice.

The user voice text display module 23 is configured to determine a text matching the user voice text in the prompting text data as a target text, and identify the target text in the teleprompter application.

Specific implementation modes of the functions of the prompting text uploading module 21, the user voice collection module 22, and the user voice text display module 23 may refer to S201 to S203 in the embodiment corresponding to FIG. 12, and will not be elaborated herein.

The target user includes a first user and a second user. The prompting text data includes a first prompting text corresponding to the first user and a second prompting text corresponding to the second user.

The user voice text display module 23 may include: a user identity determination unit 231, a first determination unit 232, and a second determination unit 233.

The user identity determination unit 231 is configured to acquire a user voiceprint feature in the voice user, and determine a user identity corresponding to the user voice according to the user voiceprint feature.

The first determination unit 232 is configured to determine, in a case that the user identity is the first user, a text matching the user voice text in the first prompting text as the target text, and identify the target text in the teleprompter application.

The second determination unit 233 is configured to determine, in a case that the user identity is the second user, a text matching the user voice text in the second prompting text as the target text, and identify the target text in the teleprompter application.

Specific function implementation modes of the user identity determination unit 231, the first determination unit 232, and the second determination unit 233 may refer to S203 in the embodiment corresponding to FIG. 12, and will not be elaborated herein.

In this embodiment of this application, the teleprompter may identify a sentence that the target user is reading, a voice of the target user may be recognized automatically with the reading of the target user, and the prompting text data is displayed in a scrolling manner in the teleprompter. Therefore, the effectiveness of a text prompting function in the teleprompter may be improved.

Figure 16:
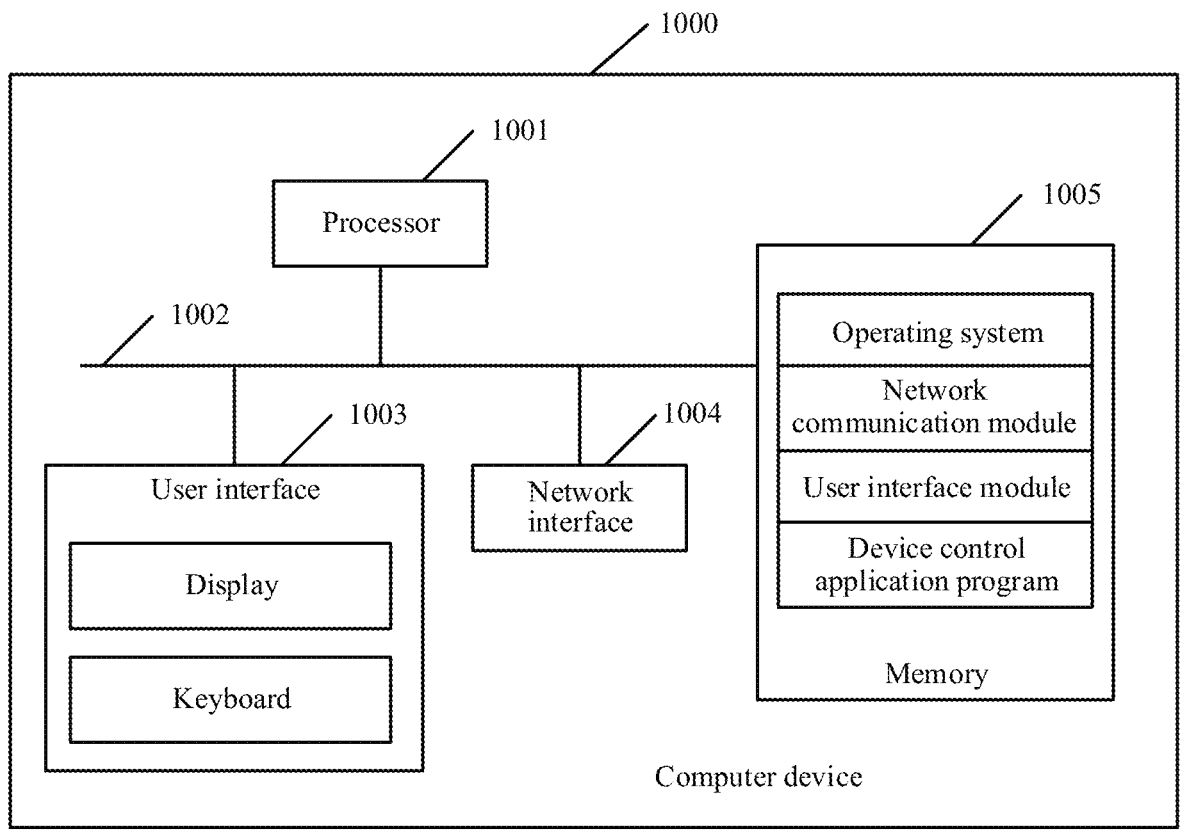
FIG. 16 is a schematic structural diagram of a computer device according to an embodiment of this application.

Referring to FIG. 16, FIG. 16 is a schematic structural diagram of a computer device according to an embodiment of this application. As shown in FIG. 16, the computer device 1000 may include: a processor 1001, a network interface 1004, and a memory 1005. In addition, the computer device 1000 may further include: a user interface 1003 and at least one communication bus 1002. The communication bus 1002 is configured to implement connection and communication between the components. The user interface 1003 may include a display, a keyboard, and in some embodiments, the user interface 1003 may further include a standard wired interface and a standard wireless interface. The network interface 1004 may include a standard wired interface or wireless interface (for example, a Wi-Fi interface). The memory 1005 may be a high-speed RAM, or may be a non-volatile memory, for example, at least one magnetic disk memory. The memory 1005 may alternatively be at least one storage apparatus located away from the processor 1001. As shown in FIG. 16, the memory 1005 used as a computer-readable storage medium may include an operating system, a network communication module, a user interface module, and a device-control application program.

In the computer device 1000 shown in FIG. 16, the network interface 1004 may provide a network communication function. The user interface 1003 is mainly configured to provide an input interface for a user. The processor 1001 may be configured to call the device control application program stored in the memory 1005 to implement the following operations:

enabling a video recording service in a video application in response to a service enabling operation in the video application;

collecting user voice data in the video recording service, determining a target text matching the user voice data in prompting text data associated with the video recording service, and identifying the target text; and acquiring target video data corresponding to the video recording service until a text position of the target text in the prompting text data is at an end of the prompting text data.

It is to be understood that the computer device 1000 described in this embodiment of this application can implement the descriptions of the data processing method in the foregoing embodiment corresponding to FIG. 3, and can also implement the descriptions of the data processing apparatus 1 in the foregoing embodiment corresponding to FIG. 14. Details are not described herein again. In addition, the description of beneficial effects of the same method is not described herein again.

Figure 17:
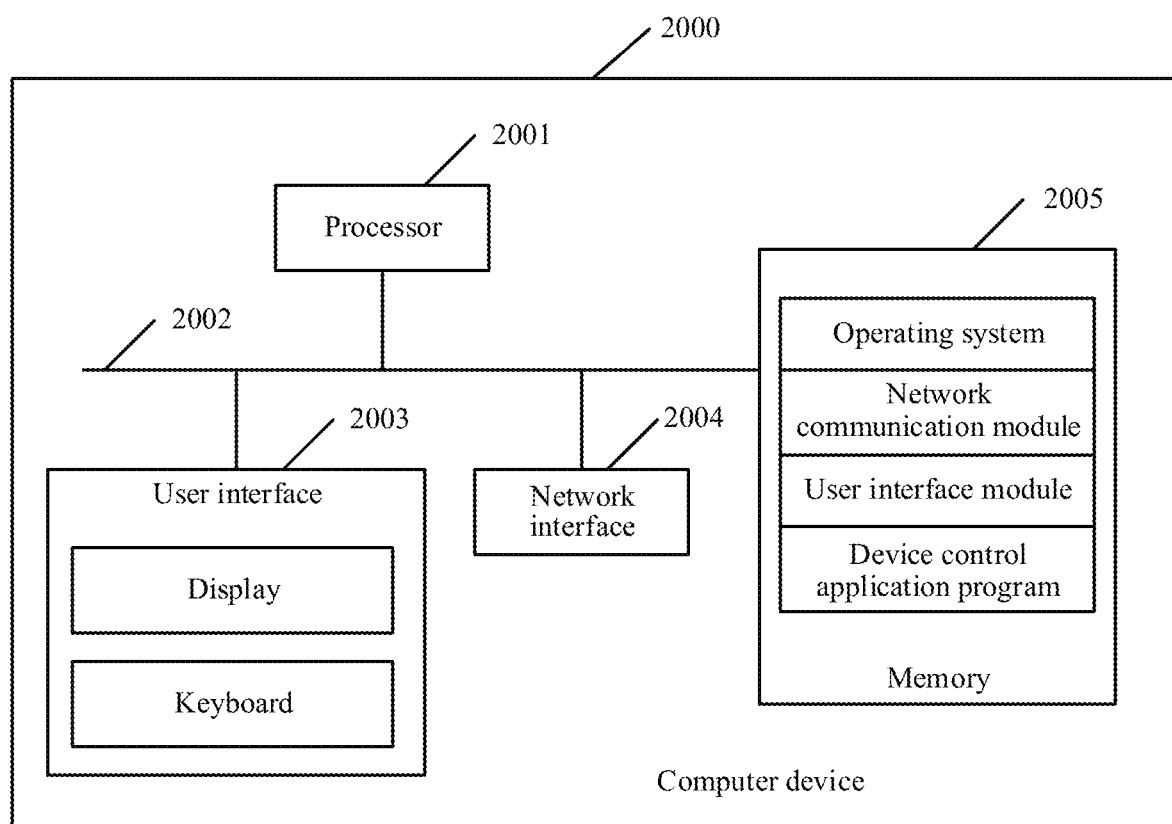
FIG. 17 is a schematic structural diagram of a computer device according to an embodiment of this application.

Referring to FIG. 17, FIG. 17 is a schematic structural diagram of a computer device according to an embodiment of this application. As shown in FIG. 17, the computer device 2000 may include: a processor 2001, a network interface 2004, and a memory 2005. In addition, the foregoing computer device 2000 may further include: a user interface 2003 and at least one communication bus 2002. The communication bus 2002 is configured to implement connection and communication between the components. The user interface 2003 may include a display, a keyboard, and in some embodiments, the user interface 2003 may further include a standard wired interface and a standard wireless interface. The network interface 2004 may include a standard wired interface or wireless interface (for example, a Wi-Fi interface). The memory 2005 may be a high-speed RAM, or may be a non-volatile memory, for example, at least one magnetic disk memory. The memory 2005 may alternatively be at least one storage apparatus located away from the processor 2001. As shown in FIG. 17, the memory 2005 used as a computer-readable storage medium may include an operating system, a network communication module, a user interface module, and a device-control application program.

In the computer device 2000 shown in FIG. 17, the network interface 2004 may provide a network communication function. The user interface 2003 is mainly configured to provide an input interface for a user. The processor 2001 may be configured to call the device control application program stored in the memory 2005 to implement the following operations:

uploading prompting text data to a teleprompter application;

collecting user voice data corresponding to a target user, and performing text conversion on the user voice to generate a user voice text corresponding to the user voice; and determining a text matching the user voice text in the prompting text data as a target text, and identifying the target text in the teleprompter application.

It is to be understood that the computer device 2000 described in this embodiment of this application can implement the descriptions of the data processing method in the foregoing embodiment corresponding to FIG. 6, and can also implement the descriptions of the data processing apparatus 2 in the foregoing embodiment corresponding to FIG. 14. Details are not described herein again. In addition, the description of beneficial effects of the same method is not described herein again.

In addition, the embodiments of this application further provide a computer-readable storage medium. The computer-readable storage medium stores a computer program executed by the data processing apparatus 1 mentioned above, and the computer program includes program instructions. When executing the program instructions, the processor can perform the descriptions of the data processing method in the embodiment corresponding to any one of FIG. 3, FIG. 11, and FIG. 12. Therefore, details are not described herein again. In addition, the description of beneficial effects of the same method is not described herein again. For technical details that are not disclosed in the embodiments of the computer-readable storage medium of this application, refer to the method embodiments of this application. In an example, the program instructions may be deployed to be executed on a computing device, or deployed to be executed on a plurality of computing devices at the same location, or deployed to be executed on a plurality of computing devices that are distributed in a plurality of locations and interconnected by using a communication network. The plurality of computing devices that are distributed in the plurality of locations and interconnected by using the communication network can form a blockchain system In addition, according to an aspect of the embodiments of this application, a computer program product or a computer program is further provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the descriptions of the data processing method in the embodiment corresponding to any one of FIG. 3, FIG. 11, and FIG. 12. Therefore, details are not described herein again. In addition, the description of beneficial effects of the same method is not described herein again. For technical details that are not disclosed in the embodiments of the computer program product or computer program in this application, refer to the descriptions of the method embodiments of this application.

In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

A person of ordinary skill in the art may understand that all or some of the procedures of the methods in the foregoing embodiments may be implemented by a computer program instructing relevant hardware. The computer program may be stored in a computer-readable storage medium. When the program is executed, the procedures of the foregoing method embodiments may be performed. The storage medium may be a magnetic disc, an optical disc, a read-only memory (ROM), a random access memory (RAM), or the like.

What is disclosed above is merely exemplary embodiments of this application, and certainly is not intended to limit the protection scope of this application. Therefore, equivalent variations made in accordance with the claims of this application shall fall within the scope of this application.

What is claimed is:

1. A data processing method, performed by a computer device, the method comprising:
in response to a service enabling operation in a video application, enabling a video recording service in the video application;
collecting, using the video recording service, user voice data;
determining and identifying in the user voice data, a target text that matches prompting text data associated with the video recording service;
in accordance with a determination that a word count of the prompting text data is greater than a count threshold, displaying, in the video application the word count and an estimated video length corresponding to the prompting text data; and
acquiring target video data corresponding to the video recording service until a text position of the target text in the prompting text data is at an end of the prompting text data.

2. The method according to claim 1, before enabling the video recording service in the video application, further comprising:
in response to detecting a triggering operation for a teleprompter shooting entry in the video application, displaying a recording page comprising a text input region in the video application; and
in response to detecting an information editing operation in the text input region, displaying, in the text input region the prompting text data provided by the information editing operation.

3. The method according to claim 1, before enabling the video recording service in the video application, further comprising:
in response to detecting a triggering operation for a teleprompter shooting entry in the video application, displaying a recording page in the video application comprising a text uploading control and a text input region;
in response to detecting a triggering operation for the text uploading control, setting a text content uploaded to the recording page as the prompting text data and displaying the prompting text data in the text input region; and
displaying a word count of the prompting text data and an estimated video length corresponding to the prompting text data.

4. The method according to claim 1, wherein the service enabling operation comprises a voice enabling operation; and
enabling the video recording service in the video application comprises:
in response to detecting the voice enabling operation in the video application, displaying a recording countdown animation associated with the video recording service on a recording page of the video application, and
executing the video recording service in the video application at an end of the recording countdown animation.

5. The method according to claim 4, wherein the recording countdown animation comprises an animation cancellation control; and
before executing the video recording service in the video application at the end of the recording countdown animation, the method further comprises:
in response to detecting a triggering operation for the animation cancellation control, canceling displaying of the recording countdown animation and executing the video recording service in the video application.

6. The method according to claim 1, wherein collecting that user voice data in the video recording service, and determining and identifying in the user voice data, target text that matches prompting text data associated with the video recording service comprises:
collecting, using the video recording service, initial user voice data, performing Voice Activity Detection (VAD) on the initial user voice data and setting valid voice data in the initial user voice data as the user voice data;
converting the user voice data into a user voice text, and performing text matching on the user voice text and the prompting text data associated with the video recording service to determine the target text matching the user voice text in the prompting text data; and
identifying the target text on a recording page of the video recording service.

7. The method according to claim 6, wherein performing text matching on the user voice text and the prompting text data associated with the video recording service comprises:
acquiring first syllable information of the user voice text, and acquiring second syllable information of the prompting text data associated with the video recording service; and
acquiring target syllable information matching the first syllable information in the second syllable information, and determining the target text corresponding to the target syllable information in the prompting text data.

8. The method according to claim 6, wherein identifying the target text on the recording page of the video recording service comprises:
determining a text prompting region corresponding to the target text in the recording page of the video recording service; and
identifying the target text in the text prompting region according to the text position of the target text in the prompting text data.

9. The method according to claim 4, wherein the recording page comprises a recording cancellation control;
the method further comprises:
in response to detecting a triggering operation for the recording cancellation control, canceling the video recording service and deleting video data recorded by the video recording service;
generating recording prompting information for the video recording service, and displaying the recording prompting information comprising a re-recording control on the recording page; and
in response to detecting a triggering operation for the re-recording control, switching the target text displayed on the recording page to the prompting text data for displaying.

10. The method according to claim 4, wherein the recording page comprises a recording complete control; and
before acquiring target video data corresponding to the video recording service until the text position of the target text in the prompting text data is the end of the prompting text data, the method further comprises:

in response to detecting a triggering operation for the recording complete control, disabling the video recording service and setting video data recorded by the video recording service as the target video data.

11. The method according to claim 1, wherein acquiring target video data corresponding to the video recording service until the text position of the target text in the prompting text data is that end of the prompting text data comprises:
    in accordance with a determination that the text position of the target text in the prompting text data is the end of the prompting text data, disabling the video recording service and setting video data recorded by the video recording service as original video data;
    displaying the original video data and an editing optimization control corresponding to the original video data on an editing page of the video application;
    in response to detecting a triggering operation for the editing optimization control, displaying one or more editing optimization modes for the original video data; and
    in response to detecting a selection operation for the one or more editing optimization modes, performing an editing optimization process on the original video data according to the editing optimization mode determined by the selection operation to obtain the target video data.

12. The method according to claim 11, wherein performing the editing optimization process on the original video data comprises:
    in accordance with a determination that the editing optimization mode determined by the selection operation is a first editing mode, acquiring target voice data in the original video data and converting the target voice data into a target text result;
    comparing the target text result and the prompting text data, and determining as an error text differences between the prompting text data and the target text result; and
    deleting voice data corresponding to the error text from the original video data to obtain the target video data.

13. The method according to claim 11, wherein performing the editing optimization process on the original video data comprises:
    in accordance with a determination that the editing optimization mode determined by the selection operation is a second editing mode, converting target voice data in the original video data into a target text result and determining as an error text differences between the prompting text data and the target text result;
    dividing the target text result into one or more text characters, and acquiring timestamps of the one or more text characters in the target voice data; and
    determining a voice pause segment in the target voice data according to the timestamps, and deleting the voice pause segment and voice data corresponding to the error text from the original video data to obtain the target video data.

14. The method according to claim 6, during execution of the video recording service, further comprising:
    acquiring a voice length corresponding to the initial user voice data and a voice word count of the initial user voice data, and determining a ratio of the voice word count to the voice length as a user speech rate; and
    in accordance with a determination that the user speech rate is greater than a speech rate threshold, displaying, on the recording page, speech rate prompting information to prompt a target user associated with the video recording service to reduce a speech rate of the target user.

15. The method according to claim 12, wherein the error text comprises one or more error subtexts;
    the method further comprises:
    determining an error frequency in the video recording service according to the one or more error subtexts and a video length corresponding to the original video data;
    in accordance with a determination that the error frequency is greater than an error threshold, recognizing a speech error type corresponding to the one or more error subtexts; and
    pushing, in the video application, a tutorial video associated with the speech error type to a target user associated with the video recording service.

16. An electronic device, comprising:
    one or more processors; and
    memory storing one or more programs, the one or more programs comprising instructions that, when executed by the one or more processors, cause the one or more processors to perform operations comprising:
    in response to a service enabling operation in a video application, enabling a video recording service in the video application;
    collecting, using the video recording service, user voice data;
    determining and identifying in the user voice data, target text that matches prompting text data associated with the video recording service;
    in accordance with a determination that a word count of the prompting text data is greater than a count threshold, displaying, in the video application the word count and an estimated video length corresponding to the prompting text data; and
    acquiring target video data corresponding to the video recording service until a text position of the target text in the prompting text data is at an end of the prompting text data.

17. The electronic device according to claim 16, wherein the instructions cause the one or more processors to perform the operations further comprising: before enabling the video recording service in the video application:
    in response to detecting a triggering operation for a teleprompter shooting entry in the video application, displaying a recording page comprising a text input region in the video application; and
    in response to detecting an information editing operation in the text input region, displaying, in the text input region the prompting text data provided by the information editing operation.

18. The electronic device according to claim 16, wherein the instructions cause the one or more processors to perform the operations further comprising: before enabling the video recording service in the video application:
    in response to detecting a triggering operation for a teleprompter shooting entry in the video application, displaying a recording page in the video application comprising a text uploading control and a text input region;
    in response to detecting a triggering operation for the text uploading control, setting a text content uploaded to the recording page as the prompting text data and displaying the prompting text data in the text input region; and
    displaying a word count of the prompting text data and an estimated video length corresponding to the prompting text data.

19. A non-transitory computer-readable storage medium, storing a computer program, the computer program, when executed by one or more processors of an electronic device, cause the one or more processors to perform operations comprising:

in response to a service enabling operation in a video application, enabling a video recording service in the video application;

collecting, using the video recording service, user voice data;

determining and identifying in the user voice data, target text that matches prompting text data associated with the video recording service;

in accordance with a determination that a word count of the prompting text data is greater than a count threshold, displaying, in the video application the word count and an estimated video length corresponding to the prompting text data; and acquiring target video data corresponding to the video recording service until a text position of the target text in the prompting text data is at an end of the prompting text data.

20. The non-transitory computer-readable storage medium according to claim 19, before enabling the video recording service in the video application, further comprising:

in response to detecting a triggering operation for a teleprompter shooting entry in the video application, displaying a recording page comprising a text input region in the video application; and in response to detecting an information editing operation in the text input region, displaying, in the text input region the prompting text data provided by the information editing operation.

* * * * *